(12) United States Patent
Mattar

(10) Patent No.: US 11,819,887 B2
(45) Date of Patent: Nov. 21, 2023

(54) LASER SYSTEM FOR NON-CONTACT AND SELECTIVE REMOVAL OF CORROSION FROM TUBES INTERNAL SURFACES

(71) Applicant: Innovaneer, Inc., Katy, TX (US)

(72) Inventor: Rami Mattar, Katy, TX (US)

(73) Assignee: Innovaneer, Inc., Katy, TX (US)

( * ) Notice: Subject to any disclaimer, the term of this patent is extended or adjusted under 35 U.S.C. 154(b) by 672 days.

(21) Appl. No.: 17/075,638

(22) Filed: Oct. 20, 2020

(65) Prior Publication Data
US 2022/0118486 A1 Apr. 21, 2022

(51) Int. Cl.
| | | |
|---|---|---|
| B08B 7/00 | (2006.01) | |
| B08B 5/04 | (2006.01) | |
| B23K 26/06 | (2014.01) | |
| B23K 26/08 | (2014.01) | |
| B23K 26/36 | (2014.01) | |
| B23K 26/16 | (2006.01) | |
| B08B 9/051 | (2006.01) | |
| B08B 9/049 | (2006.01) | |

(Continued)

(52) U.S. Cl.
CPC .......... B08B 7/0042 (2013.01); B08B 5/04 (2013.01); B08B 9/0492 (2013.01); B08B 9/051 (2013.01); B23K 26/032 (2013.01); B23K 26/0643 (2013.01); B23K 26/0648 (2013.01); B23K 26/0652 (2013.01); B23K 26/0869 (2013.01); B23K 26/16 (2013.01); B23K 26/36 (2013.01); F28G 15/04 (2013.01); B08B 2209/04 (2013.01)

(58) Field of Classification Search
CPC ....... B08B 5/04; B08B 7/0042; B08B 9/0492; B08B 9/043; B08B 9/051; B08B 2209/04; B23K 26/032; B23K 26/0643; B23K 26/0648; B23K 26/0652; B23K 26/16; B23K 26/36; B23K 26/0869
See application file for complete search history.

(56) References Cited

U.S. PATENT DOCUMENTS 5,780,806 A * 7/1998 Ferguson .............. B08B 7/0042
134/1

FOREIGN PATENT DOCUMENTS

CN 102259103 A * 11/2011

OTHER PUBLICATIONS https://www.enerquip.com/2016/01/04/chemical-cleaning-and-hydroblasting-2-ways-to-clean-your-heat-exchangers-tubes/. Downloeaded Oct. 19, 2020.

(Continued)

*Primary Examiner* — Randall E Chin

(57) ABSTRACT

An automated or manual laser ablation system and method of use to enable safe, non-user-contact, rapid, and remote cleaning of industrial tubular equipment, e.g. heat-exchangers and reactors. The laser ablation system comprises: a fiber optic cable (12) with a laser probe output end (20), connected to an optics unit (5 or 6) enclosed within a laser probe housing (14). The optics unit comprises: a double convex and/or one or two plano-convex lens; and an Axicon prism, mirror cone, and/or galvo-scanning mirror to emit a rotating or a fixed circular beam. The laser beam cleans a plurality of reactor tubes' internal wall to cause the evaporation of deposit buildups and rust. The laser ablation system further comprises: an air vacuum system (30) positioned to cool the ablation system while removing the debris to a vacuum generator (35); and/or a push motor (60) that pushes and pulls the system through the tubes.

18 Claims, 22 Drawing Sheets

(51) Int. Cl.
*F28G 15/04* (2006.01)
*B23K 26/03* (2006.01)

(56) References Cited

OTHER PUBLICATIONS https://www.thompsonindustrialservices.com/services/hydroblast-vacuum-services/hydroblasting/ Downloaded Oct. 19, 2020.
| https://inspectioneering.com/journal/2018-02-28/7416/thermal-decomposition-a-technique-for-cleaning-process-equipment Downloaded Oct. 20, 2020.

\* cited by examiner

TABLE 1
*Prior Art*

| Hydro-lancing | Hydro-blasting | Abrasive blasting | Pyrolysis | LASER |
|---|---|---|---|---|
| Way to clean the outside of tube bundles | Used to clean the tube side or inside of the tubes in a tube bundle | Way to clean the inside of tube bundles | Utilized when traditional hydro cleaning methods are ineffective | Way to clean inside and outside of tubes and any part |
| High-pressure water systems, corkscrew pattern could be left behind from high-pressure cleaning | Generate large amounts of wastewater | Damage can easily occur | Thermally decomposes product residue while maintaining the operating integrity of the equipment | Remove unwanted layers that conventional techniques cannot remove safely |
| The operator remains in the enclosed room during the entire process | Operators can only clean as fast as the slowest tube will allow | Erode ablative or self-polishing | Unpredicted effectiveness and level of cleaning | Non-contact |
| Higher level of exposure risks, hazards of an open slab environment and aerosol drifts | Required containment, capture, remediation, and disposal of cleaning sludge's | | Not popular | No environmental impact |
| Wastewater can be more of an undertaking than the cleaning process itself | Volume of water used per tube will be limited | | | Selectivity of surface treatment. Controlled removal |
| Generates large amounts of wastewater | Generate large amounts of wastewater | | | Improves surface resistivity to corrosion |
| Most managers prefer to have the heat exchangers cleaned off-site at dedicated cleaning and repair facilities to avoid any operational delays for repairs and reduce the environmental and safety liabilities at their facilities | | | | N.A. |

FIG. 1A

TABLE 3- Optics Unit

| Optics Unit (OU) | Diameter OU | Lens 32 | D* | Lens 34 | D* | Distal Component Lens 22, 36, 96, or 98 | Fixed or Rotating Laser Beam | Figures Exemplifying |
|---|---|---|---|---|---|---|---|---|
| 5 | 25 mm | Plano Convex | 2-3 mm | Plano Convex | 19-25 mm | Diffraction Axicon Prism 36 | Fixed | FIGS. 2B, 5, 7A, 7B, 8 |
| 6 | 20 mm | Double Convex | 2-3 mm | Plano Convex | 19-25 mm | Reflective Mirror Cone 96 | Fixed | FIGS. 10A, 10C, 11A |
| 6 | 20 mm | Double convex | 2-3 mm | Plano Convex | 19-25 mm | Galvo-Scanning Mirror 22 & Process Head 22 w/ hole 31 | Rotating | FIGS. 2A, 10B, 11B |
| 6 | 20 mm | Double Convex | 2-3 mm | Plano Convex | 19-25 mm | Total Internal Reflection (TIR) Axicon Prism 98 | Fixed | FIG. 12 |

* D = distance between 32, 34, and Distal Component

FIG. 1B

LASER SYSTEM FOR NON-CONTACT AND SELECTIVE REMOVAL OF CORROSION FROM TUBES INTERNAL SURFACES

FIELD OF THE INVENTION

The present invention relates to a contactless laser cleaning system for tubes within a reactor and/or a heat exchanger requiring no user-contact with the tubes, laser, or cleaning debris.

BACKGROUND OF THE INVENTION

During the operational life cycle of reactors and heat-exchangers, no matter what type of fuel or chemical product is used, soot and corrosion damage will quickly accumulate in the tubes. According to a case study performed by M&D Advance Technology, which is a company that specializes in traditional tube cleaning services, as much as ⅛ inch of soot can build up in only two weeks. This buildup reduces equipment efficiency and wastes of revenue. Soot has five times the insulating value of asbestos. The heat transfer loss in a dirty tube rises tremendously as the layer of soot builds up. Equipment efficiency can be monitored through stack temperature readings, the measure of temperature of gases when they leave boiler tubes group. For every 40° Fahrenheit rise in stack temperature, fuel consumption increases by 1%. An increase in stack temperature is an indication of dirty tubes and a signal to clean the boiler tubes with a traditional power tube cleaner.

Tubes are classified differently from pipes. Tubes are typically smaller and clustered together. High-pressure water is used to unclog tubes throughout a plant to keep the production and heat transfer efficient. Depending on design and application, a typical tubular reactor may have up to 30,000 tubes, often with small diameters and lengths up to 40 feet. Each tube is filled with one or more layers of catalyst of a different type and shape.

Over time, corrosion of the tubes can also be a cause of reduced tube efficiency or even tube failure. The need for cleaning arises because the transported medium can cause deposits, which build up in the tubes and cause obstructions.

Currently, there are four 'mainstream' methods for cleaning heat exchangers' and reactors' tubes: Hydro-lancing, Hydro-blasting, Abrasive blasting, and Pyrolysis or Thermal-Decomposition. Prior art Table 1 in FIG. 1 compares these cleaning methods with the Laser cleaning method.

The cleaning of reactors, heat exchangers, and other types of process equipment, all of which normally comprise hundreds of tubes lying in parallel (e.g. see FIG. 3), is typically done through mechanical means with the use of pressurized water (e.g., hydro-lancing, hydro-blasting). Cleaning is usually the first step in the inspection process. It is also one of the most difficult as excessive cleaning may affect the integrity of the cleaned objects. Cleaning improves equipment efficiency, restores tubes to their best working condition, extends the life of the tubes, effectively removes fouling (i.e. the buildup of unwanted deposits on the tubes' internal surfaces during their usage process), increases heat transfer and leads to fuel saving.

One solution is to coat the tubes during the manufacturing process with materials that help prevent fouling accumulation. While the passive protection of a coating system solves corrosion/erosion problems, reports show that thin film coatings of 25 to 80 millimeters have failed due to improper application, and because a thin film thickness is insufficient to withstand the long-term abuse of cooling water systems, such as from the impact during the mechanical cleanings and inspections. Counter productively, a partially failed coating may accelerate galvanic attack. Also, several tube-ends can be deformed by the improper use of high-pressure water blasting, which is used to clean the tube sheets; as a result, severe joint leaks may be created. All categories of in-water cleaning methods have the potential to damage antifouling coatings, and make the assessment of damage complicated.

Providers of water-jet cleaners claim no loss of antifouling coating for systems using water under high pressure. Protection of the coating is achieved by directing the water jet at the hull surface at an angle less than 90° F., removing fouling via horizontal shear rather than a direct force applied perpendicular to the hull. There is, however, potential for damage if the equipment is not used appropriately. Although the applied pressure may be lower during in-water cleaning, a high-pressure jet held close to and directly on a surface for too long will erode ablative or self-polishing the exposed metal. Additionally, a corkscrew pattern could be left behind from high-pressure cleaning, and this is typically due to the cleaning tip of the cleaning tool travelling too quickly.

After mechanical cleaning, not all the fouling may be removed by the process. The effective path of the mechanical cleaning is apparent by the "corkscrew" pattern down the tube. Based on a facility's asset integrity procedures, personnel are often required to verify the effectiveness of cleaning procedures of tubes, piping, vessels, and other facility equipment.

Another technological method used for heat exchanger filter pots, extruders, and other types of process equipment cleaning that also has been used is called "Pyrolysis", or "Thermal-Decomposition", a technique that utilizes heat rather than water to break down foulants. Pyrolysis may be more effective than hydro-lancing and hydro-blasting traditional cleaning methods in some cases. However, this technique is not popular and requires further investigation in terms of required downtime of equipment, cost analysis, and applicability in the field. While thermal decomposition is effective, it is not applicable to every heat exchanger. Depending on the fouling level, the type of service and how quickly the facility needs the equipment back, thermal decomposition might not be the right choice.

There are circumstances in which a process known as 'Laser Ablation', a technique that utilizes Lasers rather than water to break down foulants, provides a non-contact cleaning method and might be more effective than these traditional cleaning methods. While this is not a replacement for the use of mechanical processes, it can be a good solution in cases of problematic hydrocarbon fouling when conventional techniques are no longer feasible.

The choice of a cleaning process to use in corrosion removal or conservation is frequently complicated by questions, such as 'what will be removed?' or 'what will be preserved?'. This is because the distinction between optimum cleaning and over-cleaning is often quite subtle. In many instances, cleaning requires the operator to make a professional judgement as to what the final appearance of the object should be and thus how much of the contaminating material should be retained. The method chosen must ensure that the cleaning process does not damage the object. However, the results are often strongly dependent upon the skill and experience of the individual operator since all effective cleaning processes can cause some degree of damage if incorrectly used. In practice, it is rarely possible to entirely separate the contaminants from the object. In any case, removing a product of the deterioration process, which was originally a part of a metal, involves removing some of the metal itself.

Even if mechanical cleaning is carried out with care, techniques such as blasting will always result in some loss of material from a surface, particularly from a crumbling decayed surface, simply because abrasive particles cannot discriminate between the dirt and the substrate. The loss of surface can reduce the thickness and in extreme cases can even lead to deterioration of the material. Also, chemical-based cleaning techniques leave residues within the material which can cause long-term problems.

Lasers can remove unwanted layers that conventional techniques cannot remove safely. A typical requirement for all these cleaning applications is that the cleaning of the surface should not cause damage to the underlying material. In the cleaning of metals, a few examples of laser cleaning have been reported. Because the corrosion products are usually mixed in with the original material, it is often difficult to distinguish between them.

For cleaning of metals, two types of lasers have been reported to be effective; $CO_2$ laser (Carbon dioxide laser) and Nd:YAG laser (Neodymium-Doped Yttrium Aluminum Garnet laser). $CO_2$ laser has been applied to the cleaning of corroded metals; and Nd:YAG laser has been applied to the cleaning of aluminum, gilded bronze, lead, and archaeological finds, conservation of stone, metal, and painted artifacts, and Low Carbon Steel Alloys. Since laser cleaning can be carried out in a selective and highly precise way without exerting mechanical pressure or requiring chemicals, it allows far better preservation of surface details on fragile metal objects. However, an understanding of the technique and care in its application are required to avoid thermal damage, such as melting and oxidation of the treated metal surface.

Laser cleaning offers advantages over traditional cleaning methods involving chemical or mechanical action. These include:

Non-contact: energy is delivered in the form of light.
Low environmental impact: no hazardous chemicals or solvents, and the process generates very small quantities of waste material.
Selectivity: can be tuned to interact with specific substances. It discriminates between the dirt and the substrate.
Localized action: cleans only where directed.
Preservation of surface relief: sensitive enough to preserve fine detail.
Controlled removal: a specific thickness of material can be removed, and the laser can be stopped immediately.

However, lasers have a large initial investment cost, which is the main disadvantage of this technique.

The cleaning laser is an extremely short laser pulse at a high power that is aimed at the surface to be cleaned. The laser energy applied ablates the surface. While part of the removed material is vaporized, some remains as particulate dust and may be collected in a filtration system. This process is repeated until the required depth and area has been reached.

There are generally two distinctly different laser cleaning processes. The first, coating or rust removal, is characterized by the removal of a layer on the surface of a substrate. In this case, the chemical and physical composition of the layer to be removed differs significantly from that of the substrate. The laser light is absorbed by the targeted material layer and the substrate is not affected. There is no mechanical, thermal or chemical strain on the substrate. The second cleaning process, called laser surface decontamination, refers to the removal of impurities or contaminants deeply embedded within the surface of a material by physically removing the entire upper layer. Examples include the removal of radioactive concrete layers by laser 'scrabbling'.

The most important cleaning parameter is the energy density/fluence of the laser beam, which is defined as the energy per unit area and is usually measured in joules per square centimeter. It is important that the fluence is high enough to remove the contaminant layers, but low enough to prevent damage to the substrate.

The choice of laser system depends on the application at hand. If structures on the tens of micrometers scale are the aim of the application, a nanosecond laser will often provide sufficient accuracy, and will typically have a greater throughput, thereby making it the preferred solution. If, however, features on the nanometer scale are required, a pico- or femtosecond laser system would be a better choice.

Laser surface cleaning is a non-contact/non-abrasive process that can replace the use of abrasive or chemicals cleaning. No chemicals are used and there is no secondary waste produced. The cleaning process can be conducted remotely by an optical fiber beam delivery tool. It also has advantages over other processes in terms of automation and safety.

Laser surface cleaning can be used for micro-scale or large-scale cleaning of several materials. Contaminants ranging from radioactive elements to paint or dust particles can be effectively removed using lasers. Potential applications range in size from large commercial aircraft to microchips. High-power short laser pulses remove oil and build-up by selective decoating. The original metal substrate surfaces are neither damaged nor melted. The laser allows a non-abrasive removal of oils, grease, and rust.

Most of the incident energy can be absorbed on a targeted surface allowing selective cleaning by control of the laser wavelength. This technique is useful when the substrate and contaminant layer or particles have different laser absorption characteristics causing the substrate or particles to be rapidly heated by the laser pulse leading to their ejection or vaporization. The incident laser energy is coupled directly into bond vibrational frequencies. Hydrocarbon molecules that make up linseed oil are literally torn apart by quickly forcing the vibrations between atoms making up the molecules, such as C—C, C═C, C—O, and C—H, to vibrate so violently that the bonds break. This is different from thermal-process theory for laser ablation. They are bound by strict water usage laws that can come with stiff penalties, the water usage requirements of high-pressure water cleaning have made this approach unviable.

These conventional manual methods are problematic when associated to the mechanical damage and/or hazardous environment for the operator, especially when parts of the structure to evaluate and maintain are located at heights. In addition, these manual methods cause downtime to parts of the production facilities that are under evaluation.

Several case studies showed after utilizing conventional methods, deposits remain on tubes internal walls at micrometer levels. The type of deposits, their tenacity to adhere to the tube walls and their insulating value depend on the fluids or gases flowing within the tubes, and the result of their presence is a loss in productivity. Only lasers radiation at nanosecond pulses can ablate/clean at that level without harming the tube surfaces.

What is needed within the industry, is a safe, economical, automated method of cleaning the tubes, which requires no to minimal operator contact with the tubes and/or debris and minimizes facility shutdown.

SUMMARY

The present invention comprises a manual or an automated system and method of utilizing laser delivery techniques to perform real-time cleaning and inspection. The system further comprises interchangeable probes to fit different tube sizes. The laser delivery system further comprises an optical, optomechanical, or optoelectronic elements that are aimed at directing the ablation/cleaning laser power to tube internal walls.

One or more embodiments of the present invention comprise a laser cleaning system for cleaning a plurality of tubes within a reactor or a heat exchanger, comprising from proximal (left) to distal (right): a) a fiber optic cable comprising a probe output end (not within the probe unit) and a distal cable end (all parts of the fiber optics cable within the probe unit, from which a laser beam is emitted); b) a laser probe unit comprising a substantially hollow tubular housing enclosing the distal cable end and an optical system or unit able to produce a fixed ring laser beam or a rotating laser beam, wherein the ring beam diameter is about equal to a tube inner diameter; and c) an air vacuum system positioned over the laser probe unit, and able to cool said system while removing debris. The laser cleaning system further comprises, in an embodiment, a push motor with wheels encasing the laser cable output end to push and pull the system through each tube during the cleaning process.

The laser ablation system emits a laser beam able to ablate clean a tube inner wall from rust and other corrosive deposits while sliding said laser probe unit manually or automatedly through at least one tube. The system is extremely safe by providing no user-contact with the tubes, laser, or cleaning debris.

The method of use of the laser cleaning system comprises: manually or automatedly moving the probe unit back and forth through each tube (e.g. with the push motor) while a rotating or a fixed laser beam ablates and cleans the tube inner walls.

In an embodiment, the present invention comprises a method of safely cleaning a reactor or heat exchanger of corrosion and foul, comprising: a) providing a laser cleaning system as disclosed herein; b) inserting and pushing automatedly or manually the laser cleaning probe unit inside an individual tube in a reactor or heat exchanger equipment; c) repeating step (b) until all of the individual tubes within the reactor or heat exchanger are cleaned; d) wherein said laser cleaning system emits a laser beam able to ablate clean a tube inner wall from rust and other corrosive deposits while sliding said laser probe manually or automatedly through each tube; and e) wherein said system is safe by providing no user-contact with said tubes, laser, or cleaning debris.

In another embodiment, the laser probe unit produces fixed laser ring being emitted from probe distal end, and the optics unit five comprises from a proximal to a distal end: two plano-convex lens curved sides facing, spaced apart, and an Diffraction Axicon prism (e.g. about 22 mm from the plano-convex lens) to produce a fixed diffracted circular beam.

In an embodiment, the laser probe unit further comprises a rotating process head on a probe distal end, and the optics unit six comprises from a proximal to a distal end: a double-convex lens and a plano-convex lens (spaced, curved sides facing), and a galvo-scanning mirror spaced apart from the plano-convex lens. The galvo-scanning mirror is able to rotate clockwise or counterclockwise to emit a diffracted rotating laser beam that exits said probe unit. Additionally, the probe unit distal end further comprises a rotating process head with a hole to emit the laser beam. In an embodiment, the laser cleaning system enables the laser beam to be reflected and exit the galvo-scanning mirror at 90°, or 120° or a larger angle while the galvo-scanning mirror spins 360° constantly.

In another embodiment, the laser probe unit produces a fixed laser ring being emitted from probe distal end, and the optics unit six comprises from a proximal to a distal end: double-convex lens and a plano-convex lens (curved sides facing), and a reflective mirror cone spaced apart from the middle plano-convex lens to reflect the laser beam.

In another embodiment, the laser probe unit produces fixed laser ring being emitted from probe distal end, and the optics unit six comprises from a proximal to a distal end: a double-convex lens, and a plano-convex lens curved sides facing spaced apart, and a Total Internal Reflection (TIR) prism about 19-25 mm from the plano-convex lens to produce a fixed circular beam (e.g. about 80 to about 90 degrees perpendicular to the tube wall).

In an embodiment, the diameter of lens of optics unit five and six, is about 25.4 mm and 20 mm, respectively. The diameters of the double convex and/or the plano-convex lens, and distal component (e.g. TIR, mirror cone, galvanizing mirror, etc.) and distance between them is adjustable to optimize laser beam intensity. In an embodiment, the distance between the double convex and/or the plano-convex lens is about 2-3 millimeters; and from there to the distal components about 19-25 millimeters.

In an embodiment, the laser beam covers a spot with an area of between about 0.3 to about 2 $cm^2$; and/or wherein the rotating laser probe pulses a laser beam with about 20% to about 30% overlap.

In all embodiments, the diameter and spacing of the lens is adjustable to optimize the area and intensity and angle of the laser beam as it contacts the tube inner wall surfaces.

The laser cleaning system vacuum system comprises: a plurality of nozzles able to suction in vaporized rust or other deposits into connecting tubes for transmission to a connected vacuum generator.

The laser cleaning system's a push motor is positioned over the laser output end, and it is manually or automatedly pushed and pulled with the laser cleaning probe in/out of each tube. push motor further comprises a plurality of magnetic wheels, one wheel per a pivotable motor leg, wherein the wheels make contact with an inner tube wall.

All embodiments of the laser cleaning system may further comprise one or more of: a printed circuit board with a processor and a memory, a power source, and a wireless transmitter within the probe unit; and/or a camera or other image scanning device attached to the laser cleaning probe for real time visual examination of the cleaning progress.

The present invention aims at providing an easy, safe and cost-effective novel cleaning solution for industrial structures and equipment as an alternative to the labor intense, hazardous, and mechanical integrity impacting methods.

The invention consists of optics, optoelectronics, and optomechanics as the delivery mechanism for laser radiation. The output will produce complex mechanisms such as photo-thermal, photochemical, and mechanical effects on the target material inside tubes. The exact mechanisms that are active depend on the parameters of the laser irradiation and on the physical and chemical properties of the target foreign surface.

In an embodiment, the system further consists of interchangeable probes, of varying sizes to fit different tube diameters.

In an embodiment, the system further comprises a camera or another scanning laser unit for real time visual examination of the cleaning progress; and a user electronic computing device (e.g. a smartphone) to view the images.

In an embodiment, the present invention comprises a kit comprising: a laser optics cable, a laser output end, a laser probe, and optics unit. The kit may further comprise: a vacuum cooling system; and/or a push motor. The kit may further comprise: a vacuum generator; a laser generator; and a user electronic computing device (e.g. smartphone, tablet, etc.).

All embodiments of the system herein perform real-time cleaning of rust, corrosion and any deposits; and inspection data of surfaces under cleaning process as needed.

An objective of the present invention is to provide a method which renders it possible to remove oxides and any other buildups from metallic tube internal wall surfaces with a degree of reliability significantly higher than prior art methods, e.g. sand blasting, hydro blasting, and/or a combination of such conventional techniques.

Another objective is a cleaning system and method comprising a Fiber optic laser, which has the advantages of minimal maintenance requirements compared to other lasers, the ease of use, and environmentally friendly.

Another objective is to improve the safety wherein the system is able to perform non-contact cleaning or laser ablation of Oil & Gas, Chemical and other energy industrial tubular equipment, without the need to shut down or require lengthy downtime for tube.

Another objective to provide a cleaning system that is intrinsically safe by reducing or eliminating internal sparking, controlling temperature, and eliminating component spacing to block dust collection.

Another objection is to provide a pulsing beam of pulse laser energy between about 25 to about 100 ns. The energy output of the laser beam may be between about 1 to about 150 mJ per pulse; an energy density (fluence) between about 5 to about 10 $J/cm^2$; and an average output power between about 200 W to about 2000 W.

BRIEF DESCRIPTION OF THE DRAWINGS

The above and other features, aspects, and advantages of the present disclosure will become better understood with regard to the following description, appended claims, and accompanying drawing herein wherein the shape of the lenses in the figures is not necessarily the lenses' actual physical shape, and is merely a representation of an optics unit lenses component location in relationship to other components.

FIG. 1A is Table 1 that compares the prior art of: hydro-lancing, hydro-blasting, abrasive blasting, pyrolysis, and laser cleaning methods of reactors and heat exchangers.

FIG. 1B is a Table 3 summarizing the different embodiments of the optics units of the present invention.

DETAILED DESCRIPTION

Figure 2A:
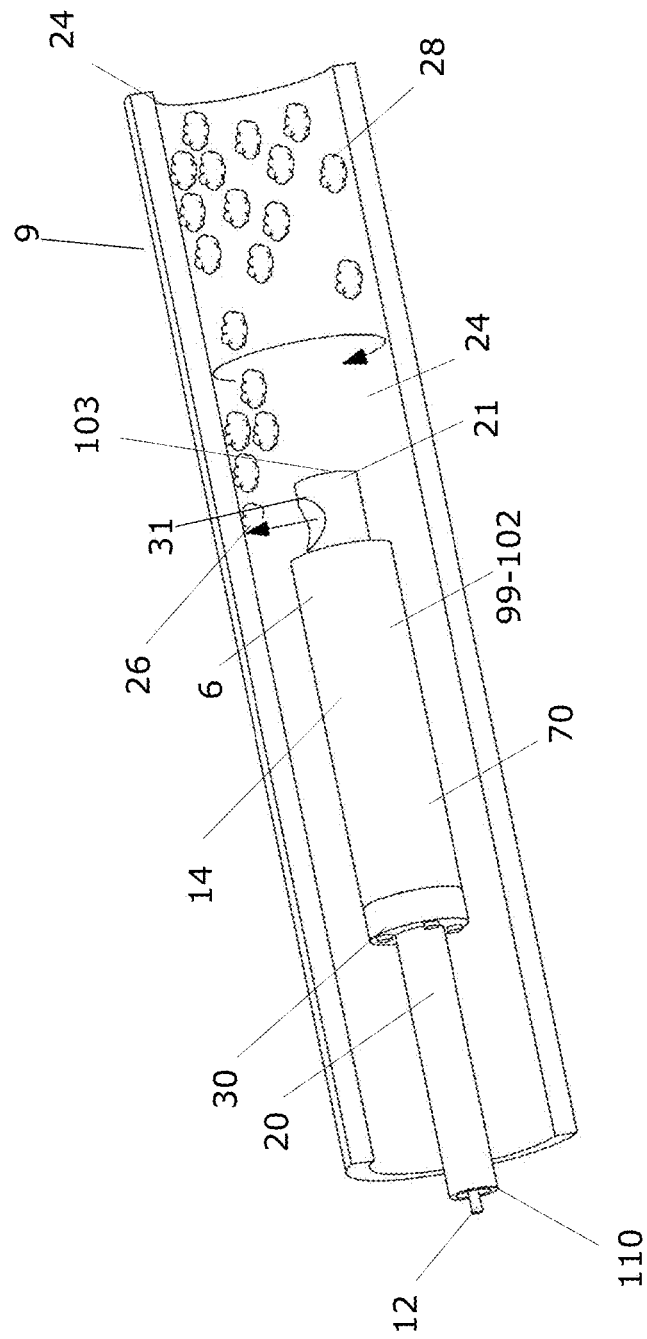
FIG. 2A is an illustration of the Galvo-scanner approach comprising a rotating laser head cleaning system in accordance with a first embodiment of the present invention.
Figure 2B:
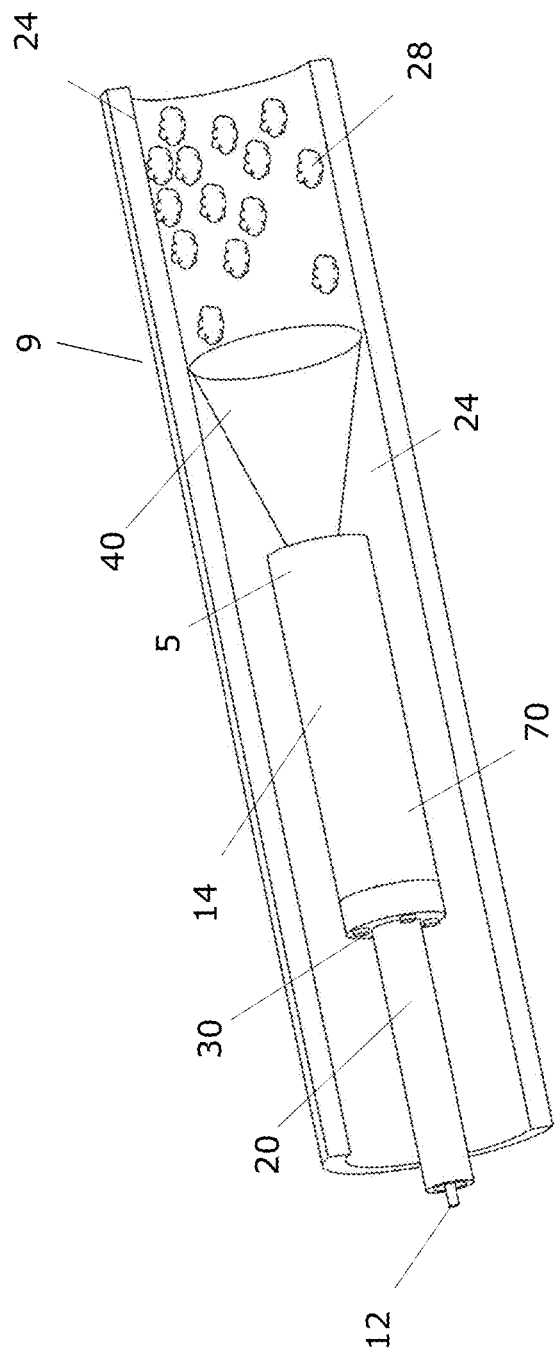
FIG. 2B is an illustration of the Diffraction-Axicon approach comprising a circular laser beam cleaning system in accordance with a second embodiment of the present invention.

Before the present invention is described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit, unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

And although any methods and materials similar or equivalent to those described herein can be used in the practice or testing of the present invention, some potential and preferred methods and materials are now described. All publications mentioned herein are incorporated herein by reference to disclose and describe the methods and/or materials in connection with which the publications are cited. It is understood that the present disclosure supersedes any disclosure of an incorporated publication to the extent there is a contradiction.

Glossary of Terms

As used herein, the term "Galvo-Scanner Approach" refers to mirrors attached to scanning motors that enable mirrors to scan with certain range (angle) and that deflect the incident laser beam in X and/or Y direction.

As used herein, the term "Bessel Beam" refers to the focused light intensity distribution from an axicon optics output.

As used herein, the term "Diffraction-Axicon approach" refers to a kind of diffractive optical element that transforms a laser beam into a ring shape (or a Bessel intensity profile).

As used herein, the term "Fouling" refers to the buildup of unwanted deposits in tubes internal surfaces during their usage process.

As used herein, the term "distal" and "distal end" refers to the area of the device furthest from the user; and "proximal" is the area closest to the user.

As used herein, the term "reflect" refers to change in direction of the beam when it bounces off a barrier while the term "diffract" refers to change in direction of the beam as it passes through a barrier in its path.

A summary of the parameters affecting the laser cleaning process of the present invention is as follows in Table 2:

TABLE 2

A. The target foreign surface condition:
   Physical properties
   Chemical properties
   Optical properties
   Thermal properties
B. The laser beam:
   Wavelength
   Spot size
   Pulse energy density or (fluence)
   Pulse length
   Pulse repetition frequency (pre
C. Other factors:
   Beam delivery system
   Skill and experience of the operator The system of the present invention uses short pulses of laser radiation source in the nanosecond scale at 200 W, 300 W, 1000 W, up to 2,000 W average power intensity producing micro plasma bursts that separates the foreign particles from the surface. The laser light does not harm the human skin as it only sublimates the dirt and rust layers.

The laser source is a commercially available Class 4 Fiber laser, which has been doped with the rare earth element of Erbium that acts as the beam source. Within this fiber is the laser medium where the erbium atoms are contained. The photons that are emitted to create the beam are also within this fiber core. It emits infrared radiation at 1064 nanometer (nm) wavelength. Fiber laser has the advantages of minimal maintenance requirements compared to other lasers, the ease of use, and environmentally friendly.

FIG. 1B is a Table 3 summarizing optics unit of the different embodiments of FIGS. 2-12. The present invention primarily comprises a laser system 2 comprising an optics unit 5 or 6, and method of its use, that focuses a beam of laser light on cylindrical tube 9 inner walls to effect evaporation of rust and other deposit buildups from their inner wall surfaces. The method may further comprise the step of pulsing the laser energy; the duration of each pulse is between 25 and 100 ns. The energy output of the laser beam may be between 1 and 150 mJ per pulse.

Figure 10A:
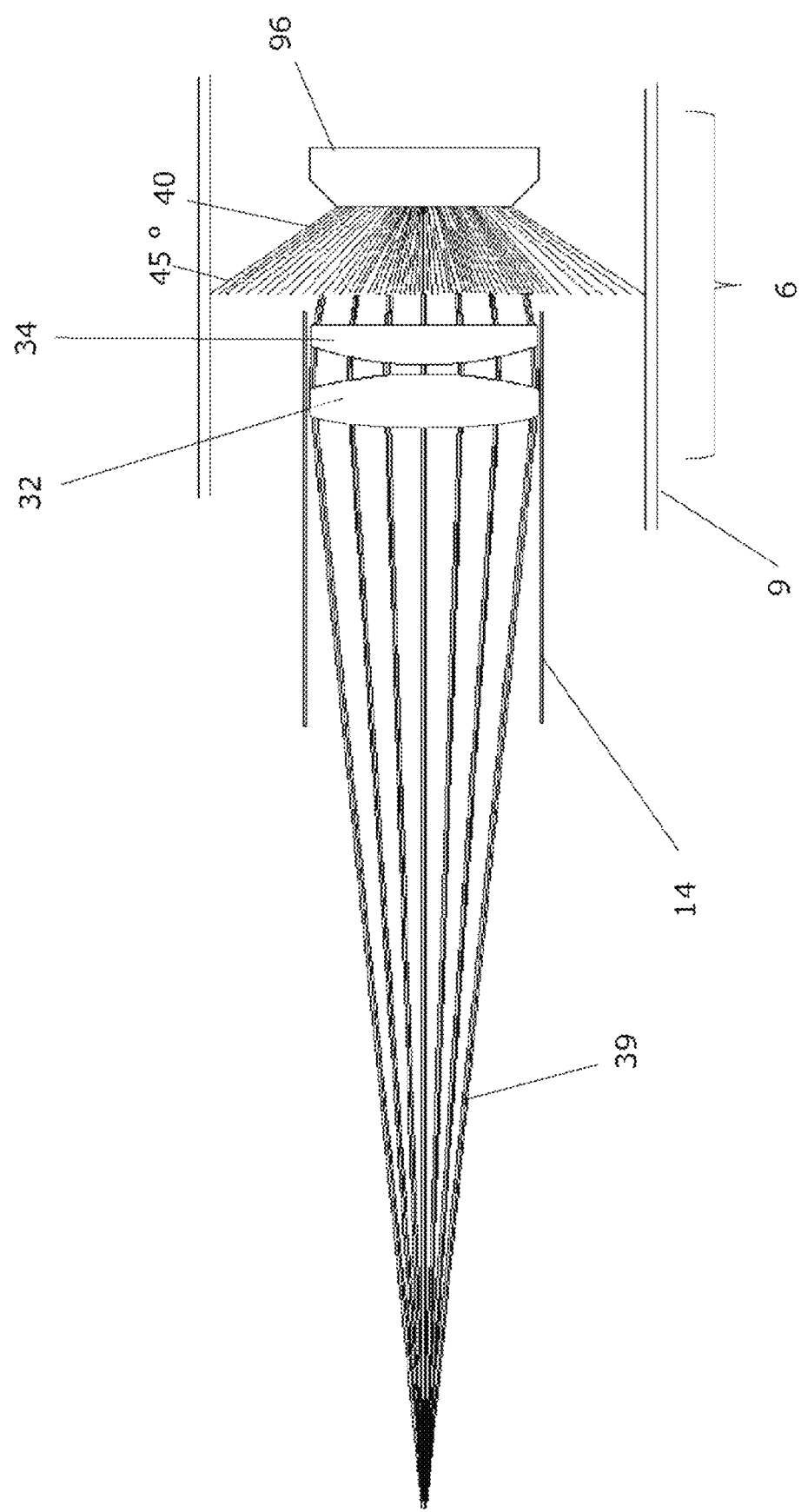
FIG. 10A is cross-sectional longitudinal (side) view of the probe unit emitting a fixed laser ring from optics unit 6 comprising a double convex lens and a plano-convex lens spaced apart about 2-3 mm, and curved sides facing, and a mirror cone to reflect the laser beam out and backwards at an angle of about 45 to about 60 degrees relative to the tube inner wall.
Figure 10C:
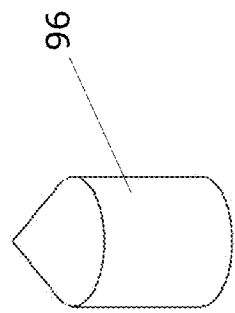
FIG. 10C is a mirror cone used in FIGS. 10A and 11A to create a simultaneous reflective 360-degree beam.
Figure 11B:
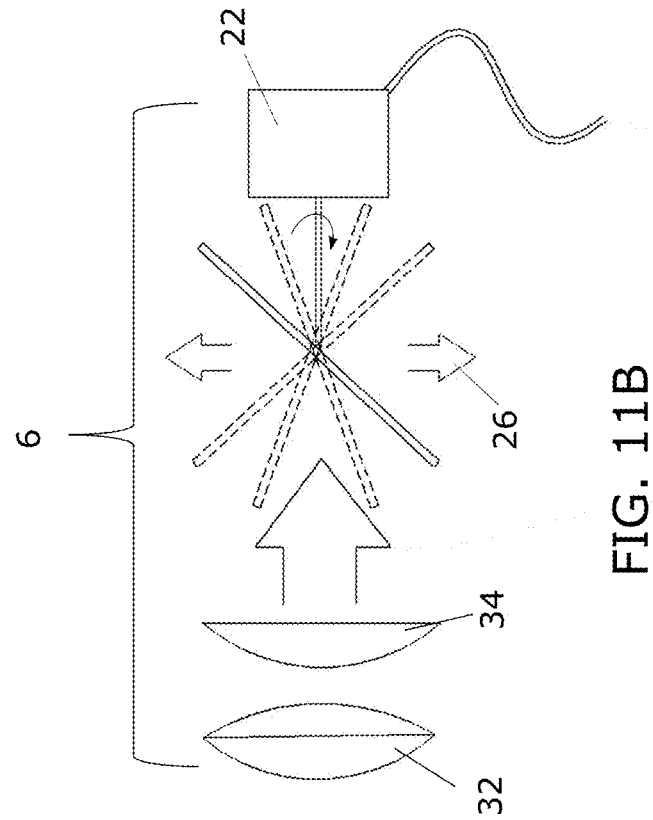
FIG. 11B is an illustration of a probe unit comprising the Galvo scanning mirror of FIG. 10B within the optical unit 6 to produce a reflected laser beam path.
Figure 11A:
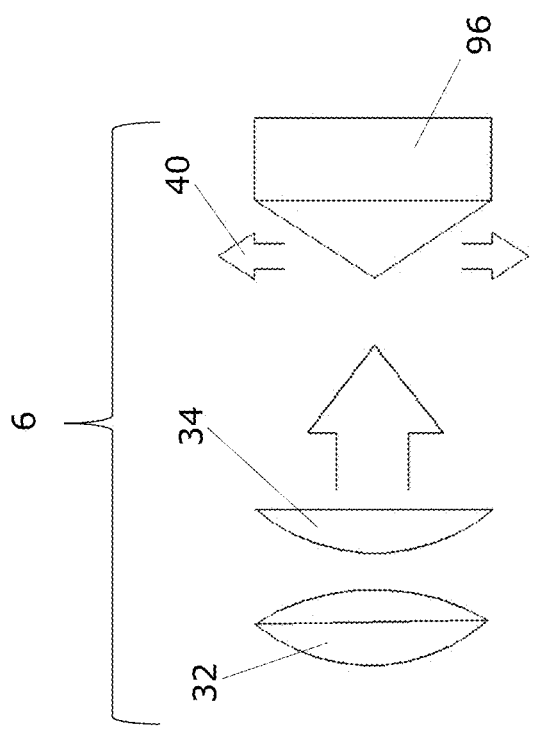
FIG. 11A an illustration of a probe unit comprising a mirror cone of FIG. 10C within optics unit 6 to produce a reflected laser beam path.
Figure 12:
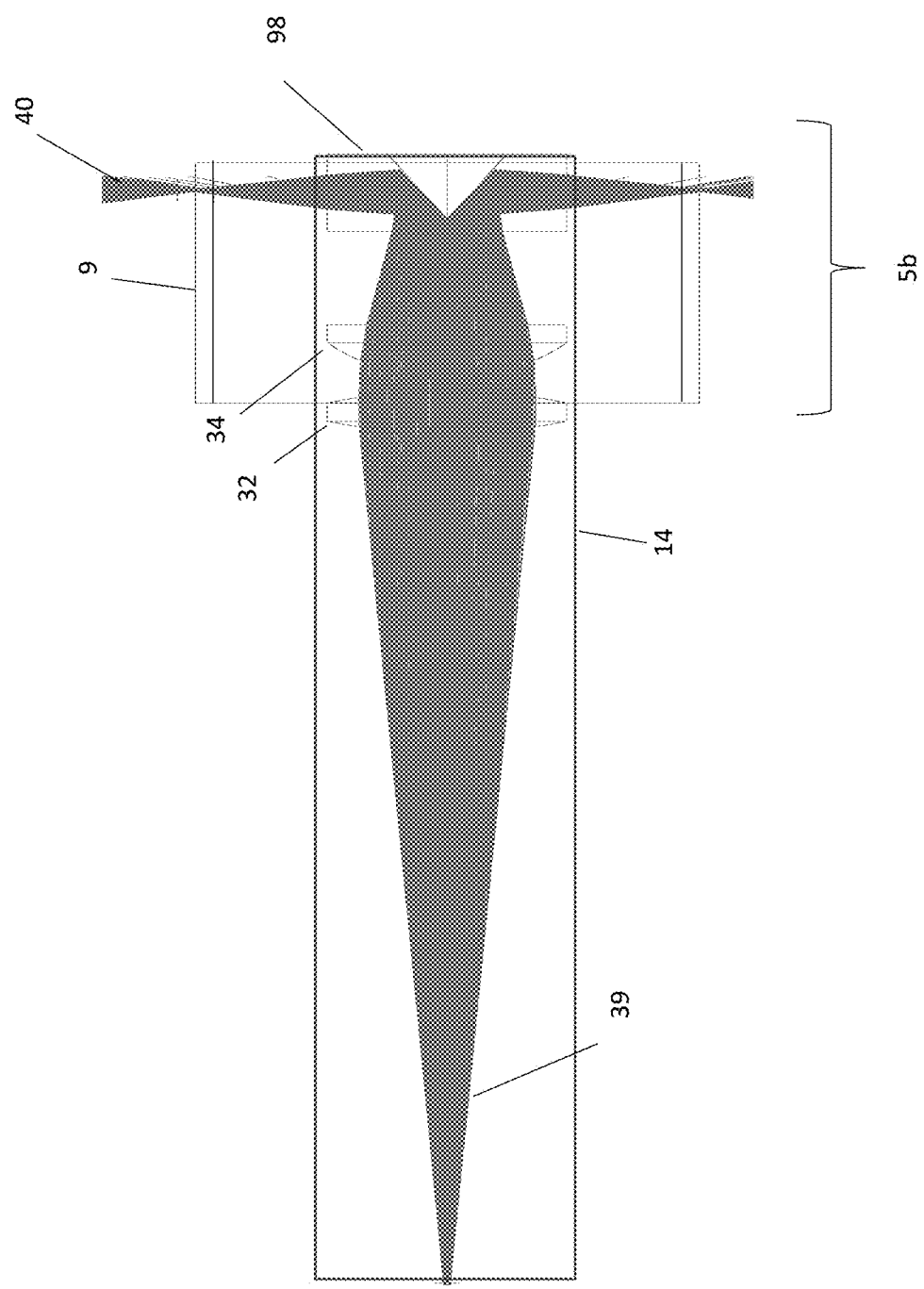
FIG. 12 is an illustration of a probe unit comprising a TIR Axicon prism in an optics unit 6 to reflect a laser beam substantially perpendicular to the tube inner wall.

One primary embodiment comprises a powered rotating laser beam (e.g. FIGS. 2A, 10B, 11B using a galvo-scanning mirror 22); and another primary embodiment (e.g. two) comprises a passive fixed ring laser beam, e.g. using a mirror cone 96 (e.g. FIGS. 10A, 10C, 11A), or a diffraction axicon prism 36 (FIGS. 2B, 5, 7A, 7B, 8); or a total internal reflections (TIR) axicon prism 98 (FIG. 12). In all embodiments of the present invention, the main components of the laser cleaning system 2 as illustrated in FIG. 3, are: the fiber-optic cable 12 connected to a laser generator 10 on the proximal end and a laser probe 14 on the distal end; and an air vacuum system 30 connected to a vacuum generator 35 able to cool probe 14. Various modifications of these two embodiments can be made by substituting different components within the optics unit 5 (two plano-convex lens 32, 34) and 6 (a double convex lens 32 and a plano-convex lens 34) as disclosed supra. The system 2 further comprises a push motor encasing probe 14 output cable to push and pull the probe through each tube. An operator may also use an electronic computing device 80 (e.g. smartphone, tablet, etc.) to view in real-time the cleaning process occurring in the tube.

Laser probe 14 comprises a substantially hollow tubular housing covering optics unit 5 or 6 that is able to emit a laser beam (rotating or a fixed circular beam) from the probe end 17 (see FIGS. 5, 7A, 7B) to clean the inner walls 24 of tube 9. The size and the distance between components of the optics unit components (e.g. 32, 34 lens, and the distal component—galvo scanning mirror 22, mirror cone 96, TIR prism 98, Diffraction Prism 36, etc.) is adjustable by one of skill in the art to optimize energy output for a specific tube diameter.

In an embodiment, as illustrated in FIGS. 2B, 5, 7A, 7B, and 8, the optics unit 5 comprises from the proximal (left) to the distal end (right) comprises: two plano-convex lenses (32, 34) curved sides facing, about 2-3 mm apart, and a Diffraction Axicon prism (36) about 19-25 mm, (e.g. 20 mm) to produce a fixed diffracted circular beam. The diameter of the optics unit lens 32, 34 is about 25 mm.

Figure 3:
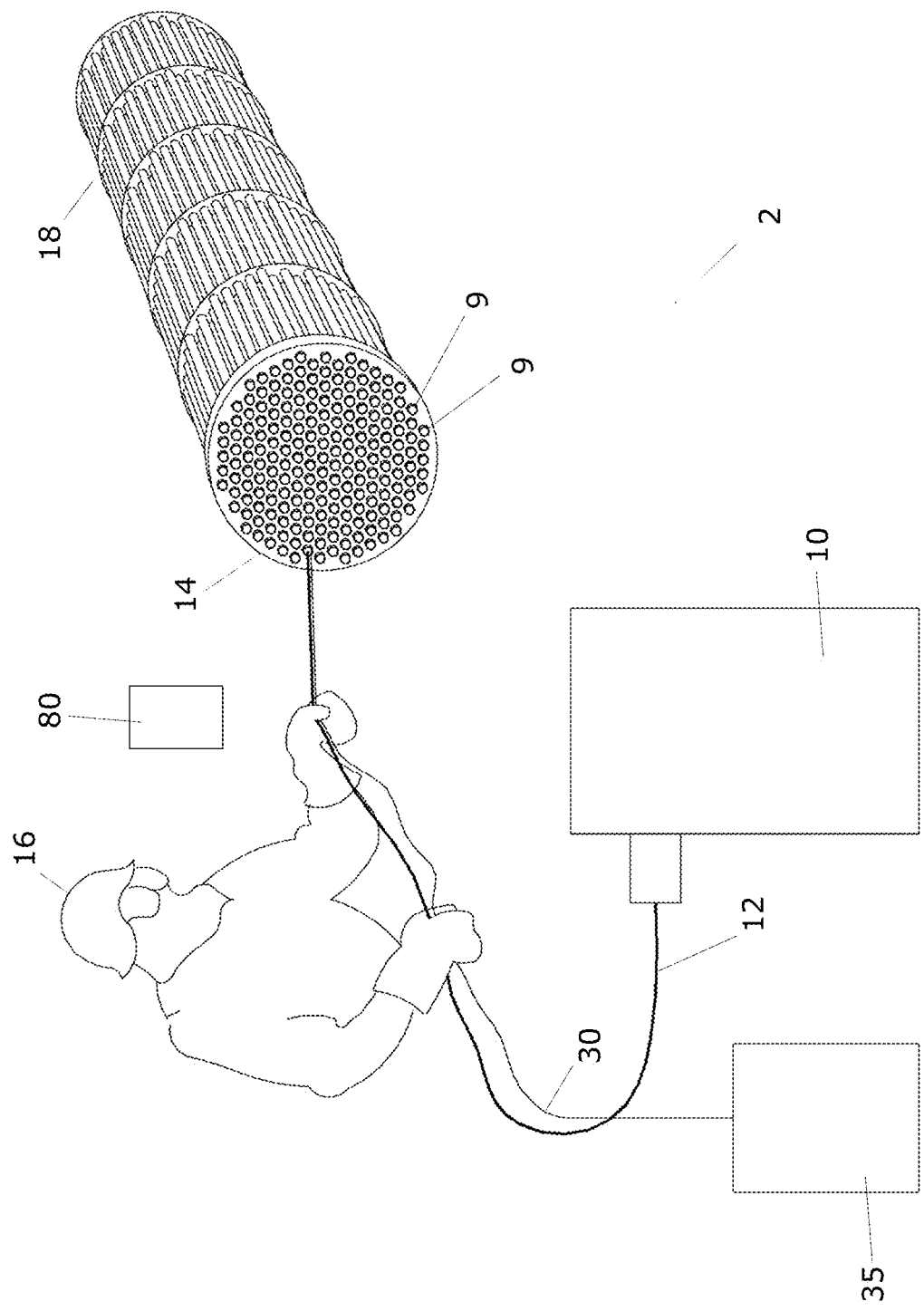
FIG. 3 is a diagram illustrating the main components of the system comprising: a heat exchanger with a laser probe of the present invention inserted within one of the tubes; and a user holding: a fiber-optic cable attached to the laser prober, and connected to a generator, and a vacuum cable connected to a vacuum generator.
Figure 10B:
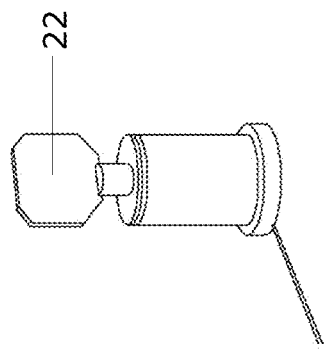
FIG. 10B is a Galvo mirror scanner used in FIGS. 2A and 10A to create a rotating laser beam.

In another embodiment as illustrated in FIGS. 2A, 10B, and 11B, the optics unit 6 comprises from the proximal (left) to distal ends (right): a double convex lens 32, a plano-convex lens 34, wherein lens 32 and 34 are spaced about 2-3 mm apart with the lens' curves facing; and a rotating galvanizing mirror 22 spaced about 19-25 mm from lens 34 to produce a rotating laser beam that ablates the tube's inner walls. The diameter of the optics unit 6 lens 32, 34 is about 20 mm. As illustrated in FIG. 2A, the probe 14 distal end further comprises a rotating process head 21 with a hole 31 to emit the laser beam 26.

In another embodiment as illustrated in FIGS. 10A, 10C, and 11A, the optics unit 6 comprises a double convex lens 32 and a plano-convex lens 34 about 2-3 mm apart, and a mirror cone 96 about 19-25 mm from lens 34 to emit a fixed reflected circular laser beam (e.g. 360 degrees) that illuminates the tube inner walls. In an embodiment, the diameter of galvo-scanning mirror is about 10 mm.

In another embodiment as illustrated in FIG. 12, the optics unit 6 comprises: a double convex lens 32, a plano-convex lens 34, wherein the curved side of lens 32, 34 are facing and about 2-3 mm apart; and a Total Internal Reflection (TIR) Axicon prism 98 that reflects the laser beam 40 into a circular ring that simultaneously illuminates the inner walls 24 of the tube 9 in a substantially perpendicular angle (e.g. about 80 to about 90 degrees in an embodiment). Other angles of contact of the laser beam with the tube inner wall can be adjusted by the skilled artisan to clean specific types and thicknesses of corrosion from the tubes. The distances between the lens in an exemplary embodiment are the same: about 2-3 mm between lens 32 and 34, and about 19-25 mm between lens 34 and 98. The diameter of the lens 32, 34 of optics unit 6 is about 20 mm.

Figure 4:
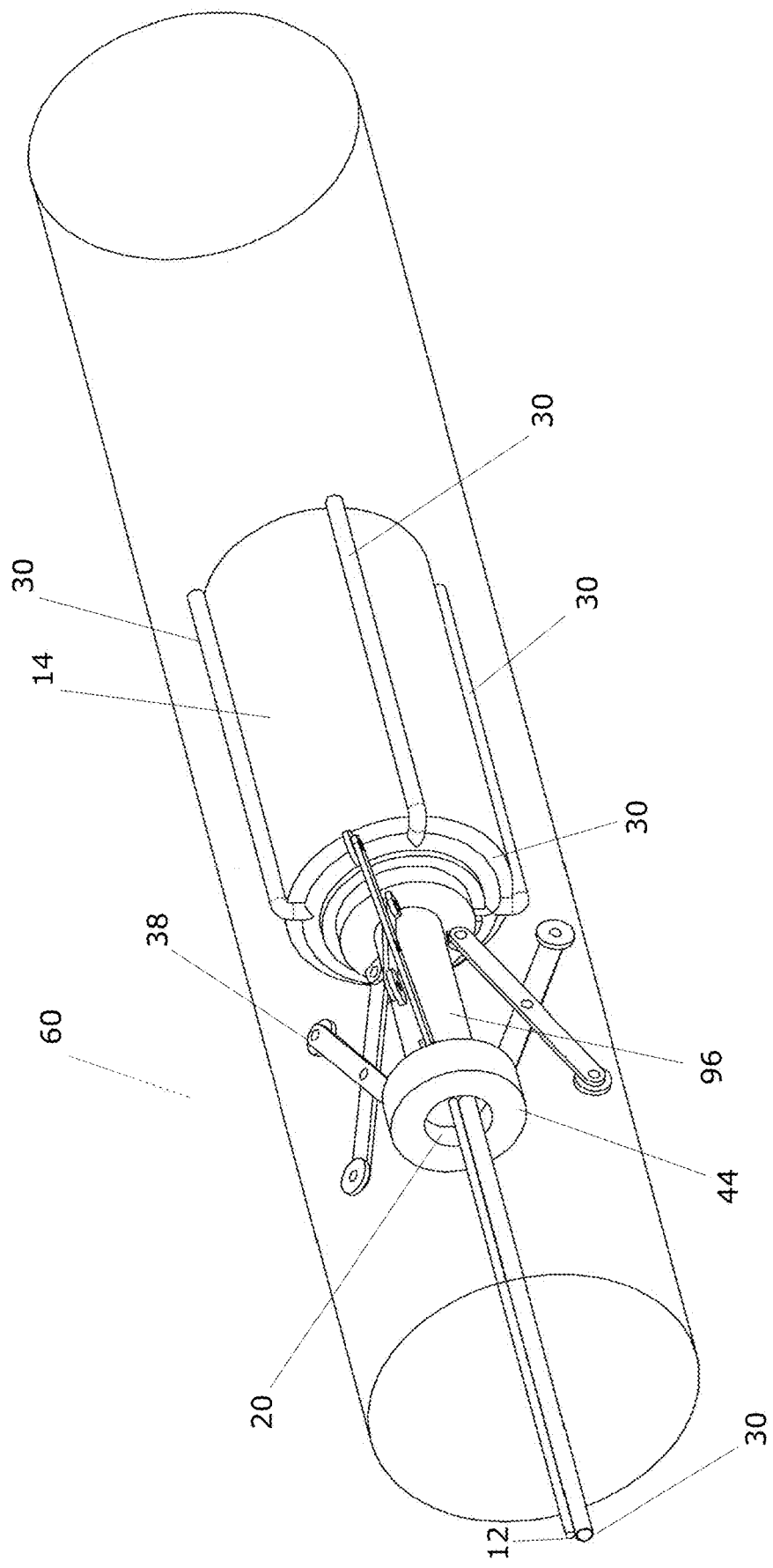
FIG. 4 is a perspective view of the laser probe of the first and second embodiment, inside of a tube and attached to a fiber optics cable, and encased by a vacuum system with a cable in parallel to the fiber cable and a push motor located covering the probe output end or unit.

The laser delivery system consists of fiber-optic cable 12 (e.g. see FIGS. 3 and 4). The fiber-optic beam delivery is a natural match for fiber lasers when they reach high industrial power levels and is now a standard for many applications using laser output up to the kilowatt range. Fiber-optic cable 12 is connected to a laser generator 10 well known in the art. A wide range of fibers-optic cables are offered for beam delivery, with core diameters from several microns to 1 millimeter, such as IPG Photonics™, Coherent™, Reycus™, etc.

In one or more embodiments, the laser cleaning system 2 is further equipped with a vacuum or blower system 30, e.g. positioned over the probe 14. System 30 sucks or blows the vaporized rust making the process fast, clean, and simple (e.g. see FIGS. 3-6, 30).

Laser Cleaning system 2 is for a non-contact cleaning or (laser ablation) of Oil & Gas, Chemical and other energy industrial tubular equipment, without the need to shut down or engage in lengthy downtime for the structure or equipment. It comprises a high-powered laser source, a laser energy delivery system, with designed cleaning head (probe unit) that can slide inside each tube to clean off corrosion and any other buildups due to its regular operation. Several cleaning-head (probes) sizes can be used for different sizes and types of tubes.

The Laser Cleaning system is designed to meet intrinsic safety requirements by, e.g., reducing or eliminating internal sparking, controlling component temperatures, and eliminating component spacing that would allow dust to short a circuit. Elimination of spark potential is accomplished within the system components by limiting the available energy in the printed circuit board (PCB) of the laser cleaning probe device 100 and the system 2. Generally, component spacing, siting and isolation has been considered in the design. The system is thus intrinsically safe or explosion-proof that is able to be used in explosive atmospheres, such as refineries. It meets special power supply criteria to achieve certifications for use in explosive atmospheres.

Referring to FIG. 3, there is shown the method of use of laser cleaning system 2 comprising: a laser generator 10 with the fiber-optic cable 12 that guides the laser output from the generator to the present invention's probe unit 14 that slides and travels through each tube 9 for tube ablation and cleaning from rust and any other build ups and residues. A technician 16 inserts and pushes the laser cleaning probe unit 14 inside individual tube 9 in a reactor or heat exchanger equipment 18. A vacuum generator 35 is connected to a vacuum tubular system 30 that covers the probe unit housing 14 to suck the debris out of the tubes while cooling the entire system 2.

Rotating Laser

Referring to FIGS. 2A, 10B, and 11B of embodiment one galvo-scanning, the fiber-optic cable 12 distal output end 20 is connected to a collimating and focusing optics unit 6 enclosed in the probe 14 housing or unit, which it is pushed and pulled through each tube 9. The diverging output beam 39 from the fiber-optic 12 is collimated, focused, then reflected from the galvo-scanning mirror 22 (e.g. FIG. 10B) that is held at 45° angle or larger (relative to vertical or perpendicular to probe distal end) to direct the focused laser energy that exits the unit 6 onto the tube inner wall 24 for ablation/cleaning. The internal components of optics unit 6 are similar to optics unit 5, and comprise from left (proximal) to right (distal): double convex lens 32, plano-convex lens 34, and a galvo-scanning mirror 22 that collimates then reflects the laser light. Lens 32 and 34 are curved sides facing but not touching, and the galvo-scanning mirror 22 are spaced distally about 19-25 millimeters distance from lens 34.

The laser beam output 26 exits the galvo-scanning mirror at 90°, or 120° or larger angle while the galvo-scanning mirror 22 spins 360° constantly. This makes sure the laser beam spot 26 scans and covers the whole tube inner circumference at 100%. The focusing step may include focusing the beam upon a spot with an area of between 0.3 and 2 cm². The direction of spinning or rotation of galvo-scanning mirror 22 can be clockwise or counterclockwise to ablate clean tube inner wall from rust and other deposits 28. Several different approaches are suggested when designing the optical output. One approach is to pulse around using a rotating laser process head with 20% to 30% overlap.

Although not illustrated in FIG. 2A, the laser cleaning system 2 with the rotating head is further equipped with a vacuum system 35 that sucks the vaporized rust or other deposits out through a multiple nozzle and hose setup 30, as shown in FIGS. 3-6.

Laser tube cleaning using the galvo-scanning mirror 22 approach will ablate clean contamination on the inner wall 24 of the tube. This contamination layer absorbs the laser beam spot pluses output very well, whereas the base Carbon steel material will reflect most of the energy, hence remain unharmed. The laser achieves full tube inner wall cleaning when the rotating process head completes 360° rotations that rotates the reflected laser pluses off the output mirror with 20% to 30% overlap.

Probe 14 housing or unit further requires an energy source to provide power to rotate the galvo-scanning mirror 22. By way of non-limiting examples as illustrated in FIG. 2A, a power source 100 comprising: an internal battery built into the probe 14 housing or unit, and/or a power cord can run from probe 14 in parallel with the cable 12.

Fixed Laser Ring

In the second embodiment comprising a fixed ring of laser light, as illustrated in FIGS. 2B, 5, 7A, 7B, 8, 10A, 10C, 11A, and 12, the system and method comprise the step of focusing a ring laser beam 40 using an optical adapter or unit 5 or 6 that produces a ring laser profile at nearly equal to the tube inner diameter to simultaneously cover the whole inner circumference of the tube 9. The fiber-optic cable 12 laser output 20 is connected to collimating and focusing optics unit 5 or 6 enclosed in the probe 14 housing to produce a focused ring shape beam laser 40, consisting of conical lenses and rotationally symmetrical prisms. These elements transform a laser beam with a Gaussian profile into a Bessel beam. The lens-axicon combination illuminated by the Gaussian laser beam produces focused irradiance distribution on the ring-shaped laser output. Matching the produced ring laser output diameter with the tube inner diameter creates a constant real-time ablation. In the fixed laser ring embodiment, probe 14 reflects the collimated laser output beam using diffraction axicon prism 36 or TIR axicon 98 to ablate clean the inner wall surface of the tube while scanning. Probe 14 is a passive devise that consists of optical components only without the need for an electrical circuit with a power source (e.g. battery or power cord).

Figure 5:
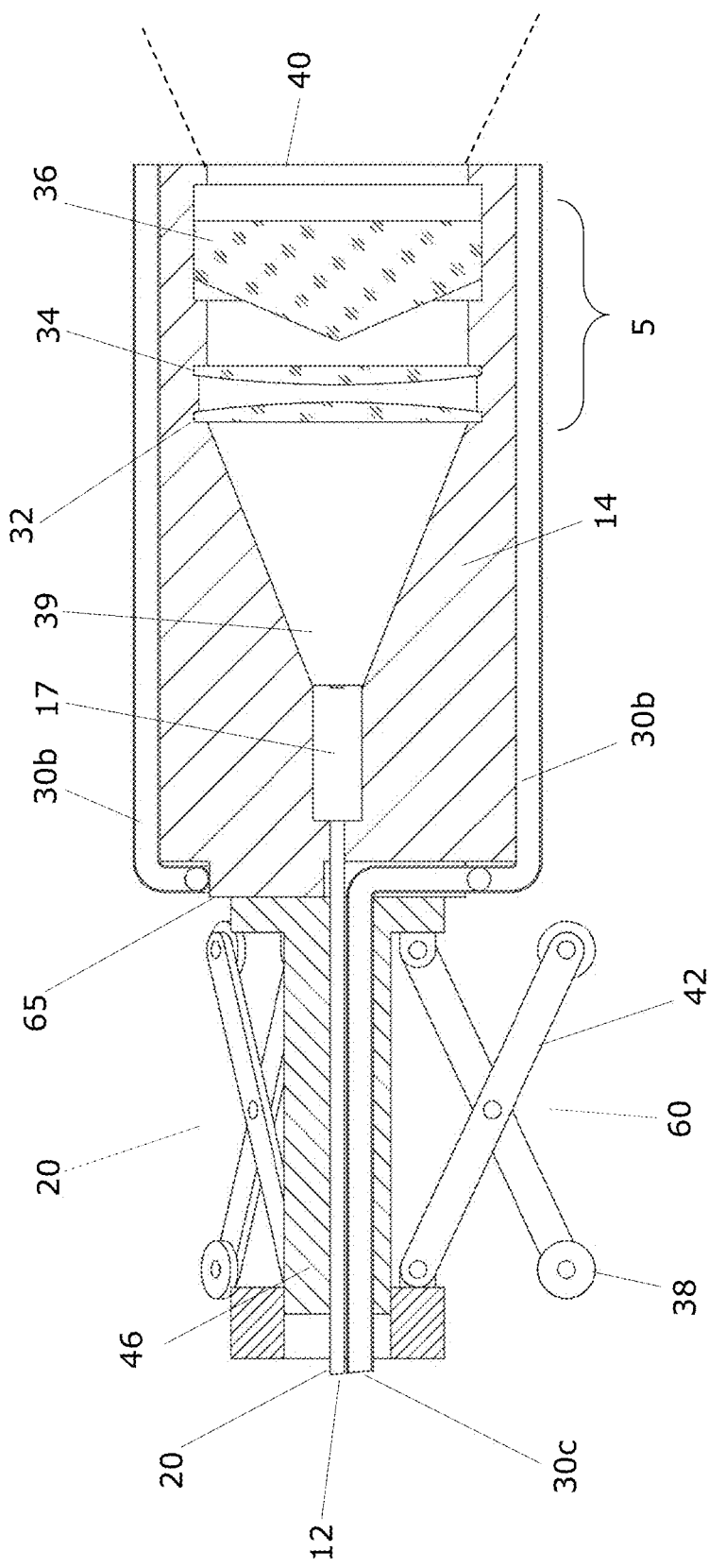
FIG. 5 is a longitudinal cross-sectional view of FIG. 4 taken along line C'-C' illustrating the components within the laser probe housing comprising the laser distal end emitting a laser light that passes through an optics units 5 to create a simultaneous 360 degree beam.

FIG. 5 is a cross-sectional view of a laser probe 14 housing connected to a fiber optics cable distal end. Probe 14 comprises from left to right (proximal to distal in relation to the user): the distal end 17 of a fiber optic cable 12 that runs from laser generator 10 (FIG. 3) and an optical unit 5, both fixed within a wider probe outer housing 14, which is a hollow tube. The distal end of fiber optics cable 12 is encased in a metal coating, with a middle section called herein as the probe output 20, which is too wide to slide into housing 14, and fiber optic cabled distal end 17, which locks into housing 14.

As illustrated in FIGS. 5 and 12, the fiber optics cable distal end 17, otherwise known as a QB fiber connector, is a laser emitter that releases a laser light 39 that passes through optics unit 5 to emit a laser light 40 as a ring illuminating the inner tube wall 360 degrees. The probe housing 14 is further encircled on the outer surface by the vacuum system 30 of FIG. 6 that suctions off the debris released from the inner walls and transports it back to vacuum generator (FIG. 3, 35).

Fiber optics cable 12 and the main vacuum line 30c are positioned outside the probe housing 14, in contact, and further encircled by a push motor 60 that is able to push and pull probe 14 through a tube while it is being cleaned. FIGS. 5, 7A, 7B, and 8 are illustrations of the optical components of unit 5 within probe 14.

In an embodiment of the fixed laser ring as illustrated in FIGS. 11A and 12, the optical components within probe 14 housing that make up the optics unit 6 comprise from left to right: a convex lens 32 and plano-convex 34, and the laser light passes through opposing convex lens 32, 34, which are about 22 millimeters apart, to cause the laser beam to become collimated and focused before it is reflected off the mirror cone 96 (FIG. 11A) or the TIR Axicon 98 (FIG. 12).

In another embodiment, as illustrated in FIG. 10A the laser light passes into and is reflected about 45 degrees back out of a mirror cone 96. Thus, the optical unit 6 comprises the mirror cone 96 positioned on the right side (distal end) of lens 34 at a distance of about 22 millimeters. The laser beam forms a 360-degree ring to simultaneously clean the inner tube walls. As a passive system, it does not require rotation of the cone 96.

Push Motor

Figure 9:
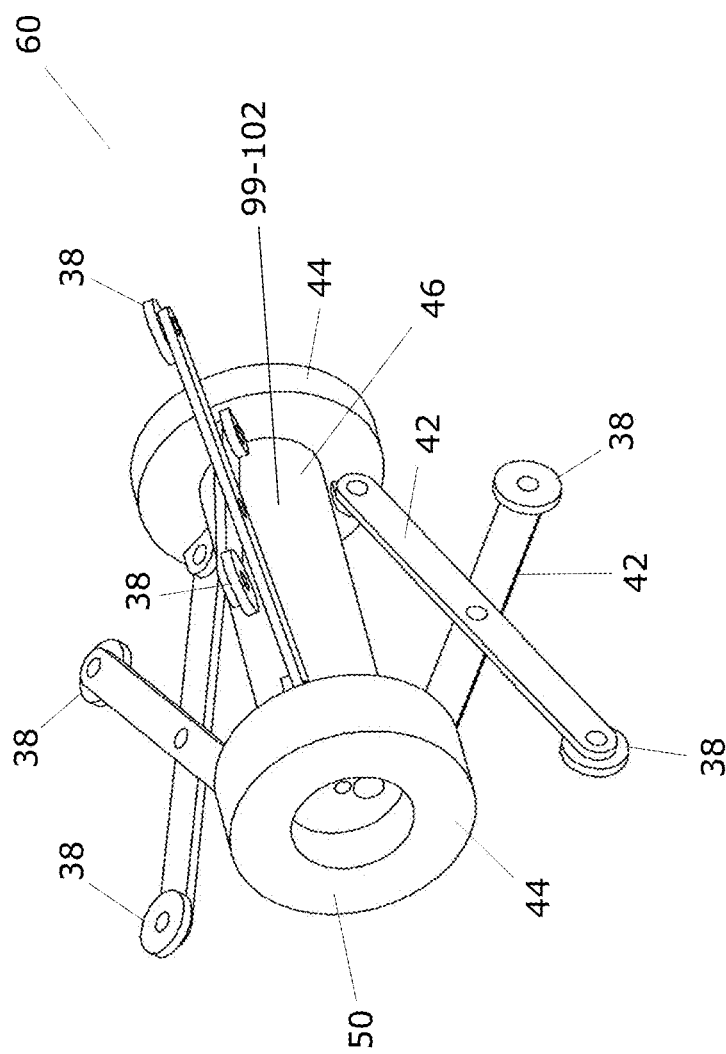
FIG. 9 is a diagram of the push motor to manually or automatedly move the probe unit back and forth through each tube.

As illustrated in FIGS. 4 and 9, both probe 14 slides smoothly through the tubes 9 manually or in a controlled automated fashion using the magnetic wheels 38 (2 or 4 wheels) that surrounds the enclosure as part of a Push Motor 60. The main components of push motor 60 comprise: a hollow tubular body 46 through which the fiber optics cable 12 and the vacuum line 30 pass; two opposing donut-shaped ends 50; two to four crossed pivotable legs 42, each leg connected to a wheel 38 that makes contact with the tube inner wall to move the probe 14 through it. In a further embodiment, at least one of the wheels 38 on push motor 60 is encoded to count the distance of travel.

The magnetic wheels 38 are used to push or pull the probe 14 in/out of the tube 9 smoothly either manually or in a controlled powered fashion. For example, in a powered push motor 60, a computing unit 50 housed within or accessible to the motor, comprises one or more of: a printed circuit board, microprocessor, wireless transceiver, memory, internal power source (battery or cable); and unit 50 is able to remotely control the movement of the push motor legs 42.

Vacuum System

Figure 6:
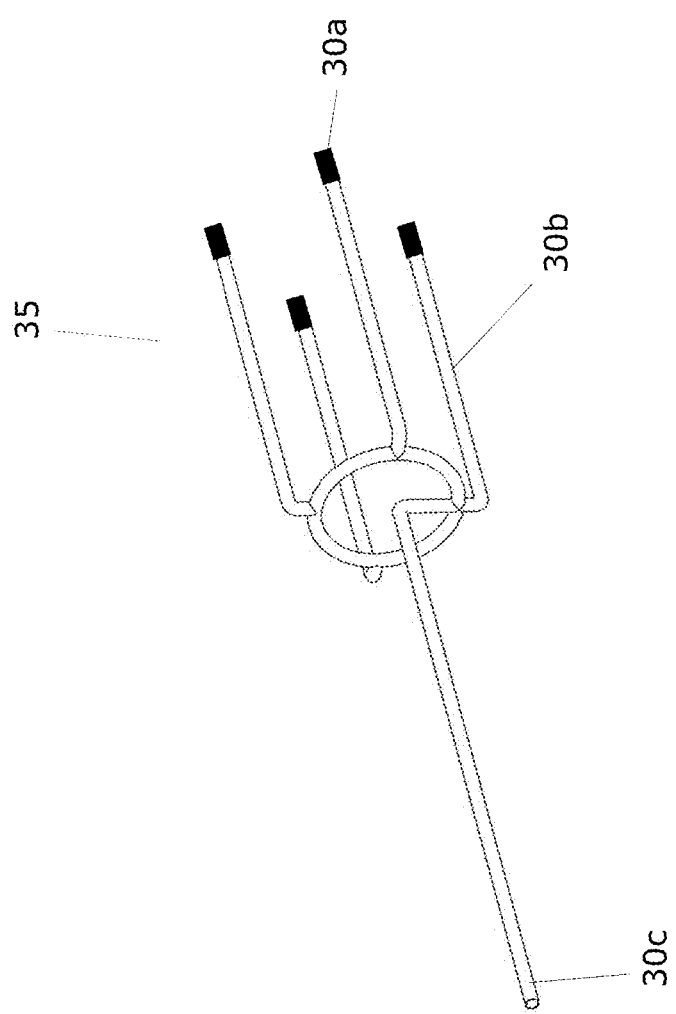
FIG. 6 is an illustration of the vacuum system without the laser probe.
Figure 7A:
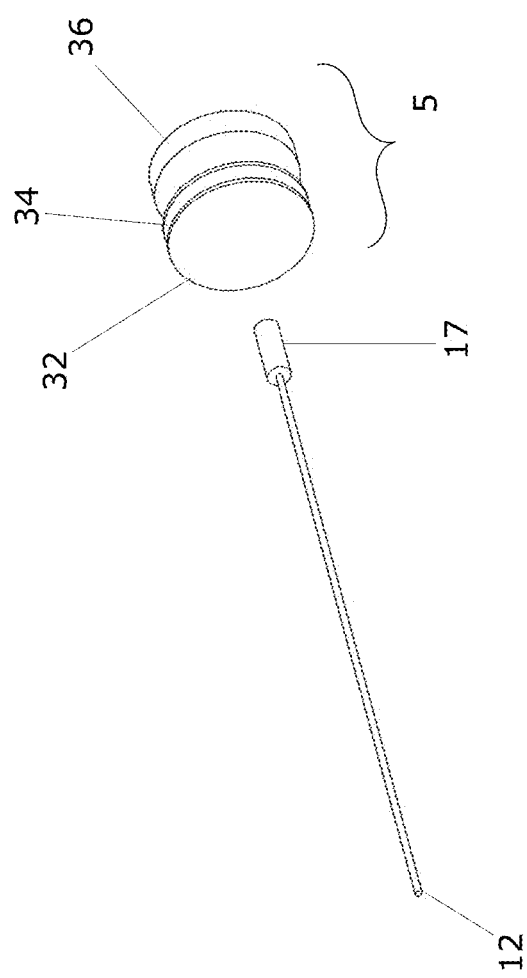
FIG. 7A is a perspective view of the system components within the laser probe housing comprising from left to right (proximal to distal end): the fiber optic cable; the laser output end; and the optics unit.
Figure 7B:
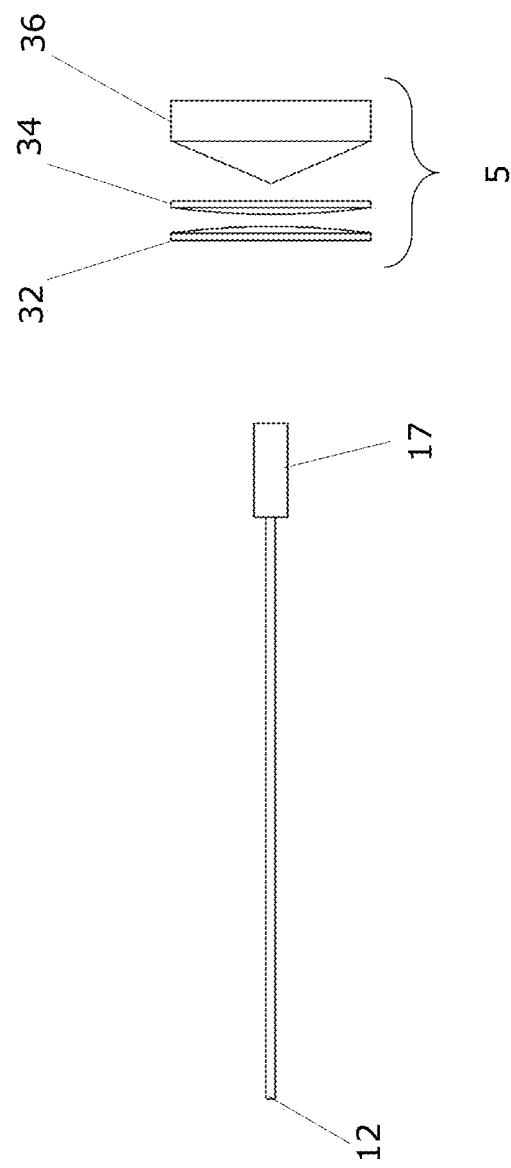
FIG. 7B is a side view of FIG. 7A.

As illustrated in FIG. 6, the smoke or gaseous product of laser cleaning will be blown or sucked through the integrated vacuum system 30, which provides air cooling to the system by pumping air in or out of system 2 and over the probe 14. The smoke or gaseous product resulted from ablation is suctioned through the nozzles 30a, transmitted through the multiple tubes (4 or 8 tubes) 30b surrounding the optical enclosure, then all combined and transmitted through the main tube 30c that is attached in parallel with the fiber-optic cable 12. Main tube 30c transports the air and debris to vacuum generator 35 (FIG. 3) or releases it outside of the heat exchanger 18. Although structure 18 is illustrated as a heat exchanger equipment, the system 14 is equally suitable for use in ablation/cleaning a wide range of other tube based industrial structures such as reactors (vertical and horizontal).

In an embodiment, the system further consists of interchangeable probes 14, of varying sizes to fit different tube diameters.

In an embodiment, system 2 further comprises a camera 1030 or another scanning laser unit for real time visual examination of the cleaning progress. Camera 103 may be mounted on the outer surface or the distal end, such as: near mirror 22 in FIG. 2A of the probe 14; or on the fiber optics cable end 17 or optics unit 5 outer surface of probe 14. The camera is able to record images of the tube inner walls 24 and store them in memory; and/or wirelessly transmit them to a remote user's electronic computing device (e.g. an operator's display unit, such as by way of non-limiting examples, a user's smartphone, tablet, etc.—FIG. 1, 80) for real-time viewing.

In all embodiments of FIGS. 1-12, the laser cleaning system may further comprise within the probe unit 14 and/or in the push motor as illustrated in FIGS. 2A and 9, one or more of: a printed circuit board 99 with a processor and a memory 101, and a wireless transmitter 102 (e.g. to transmit camera images), and a power source 100 (e.g. battery or power cord).

EXEMPLIFICATIONS

Example 1

Figure 8:
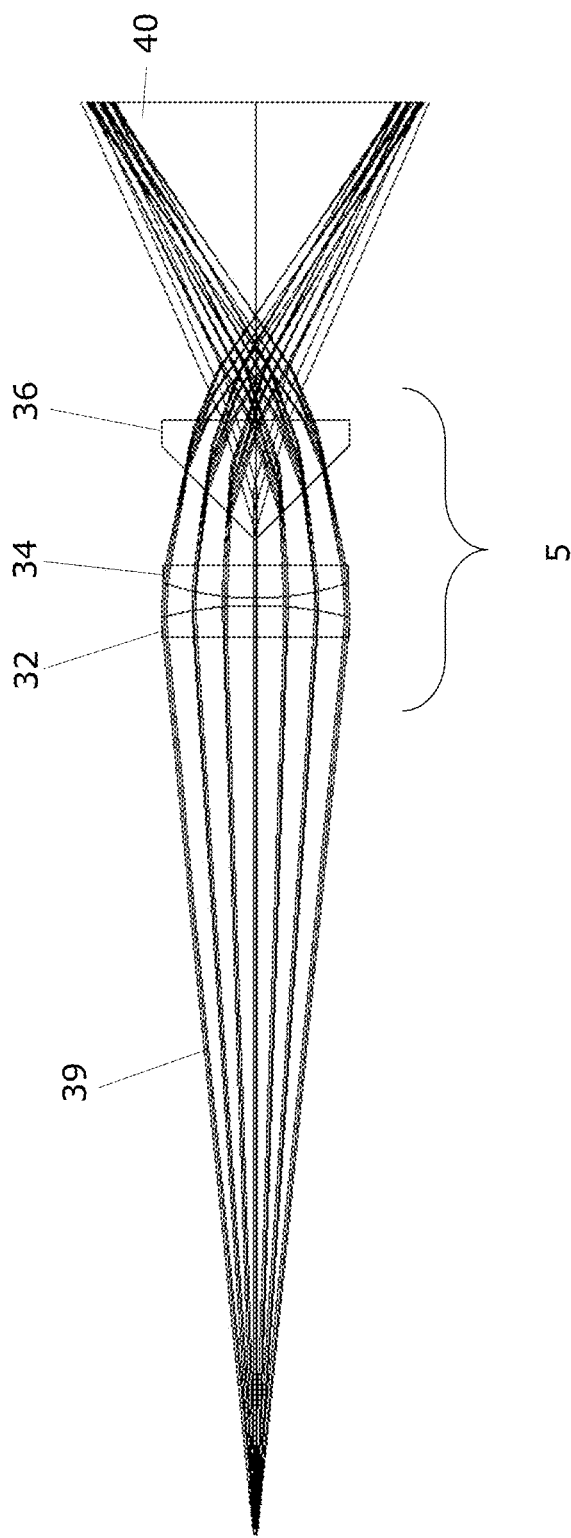
FIG. 8 is side view of the laser beam of FIG. 5 illustrating the Diffraction Axicon prism concept of the laser light passing through the optics unit 5 to create a fixed 360 degree beam.

An experiment was performed using the laser cleaning system of FIG. 8 comprising: two plano-convex lens 32, 34 with curves facing, and a Diffraction Axicon lens 36. The beam parameter (min) is 25 mm (lens 32), 24.4 mm (lens 34), and 12.8 mm (lens 36). Table 4 show irradiance parameters with respect to sampled tube 9 inner diameters; '39, 42, and 45 mm'. It is based on a design with the focusing option of axicon parameters; with apex angle 90 degrees, and the axicon surface is turned to the lenses side.

TABLE 4

| LEVEL | Tube Diameter 39 mm | Tube Diameter 42 mm | Tube Diameter 45 mm |
|---|---|---|---|
| 0.5 max | 0.6 mm | 0.68 mm | 0.68 mm |
| 0.1 max | 1.25 mm | 1.36 mm | 1.35 mm |

Figure 13A:
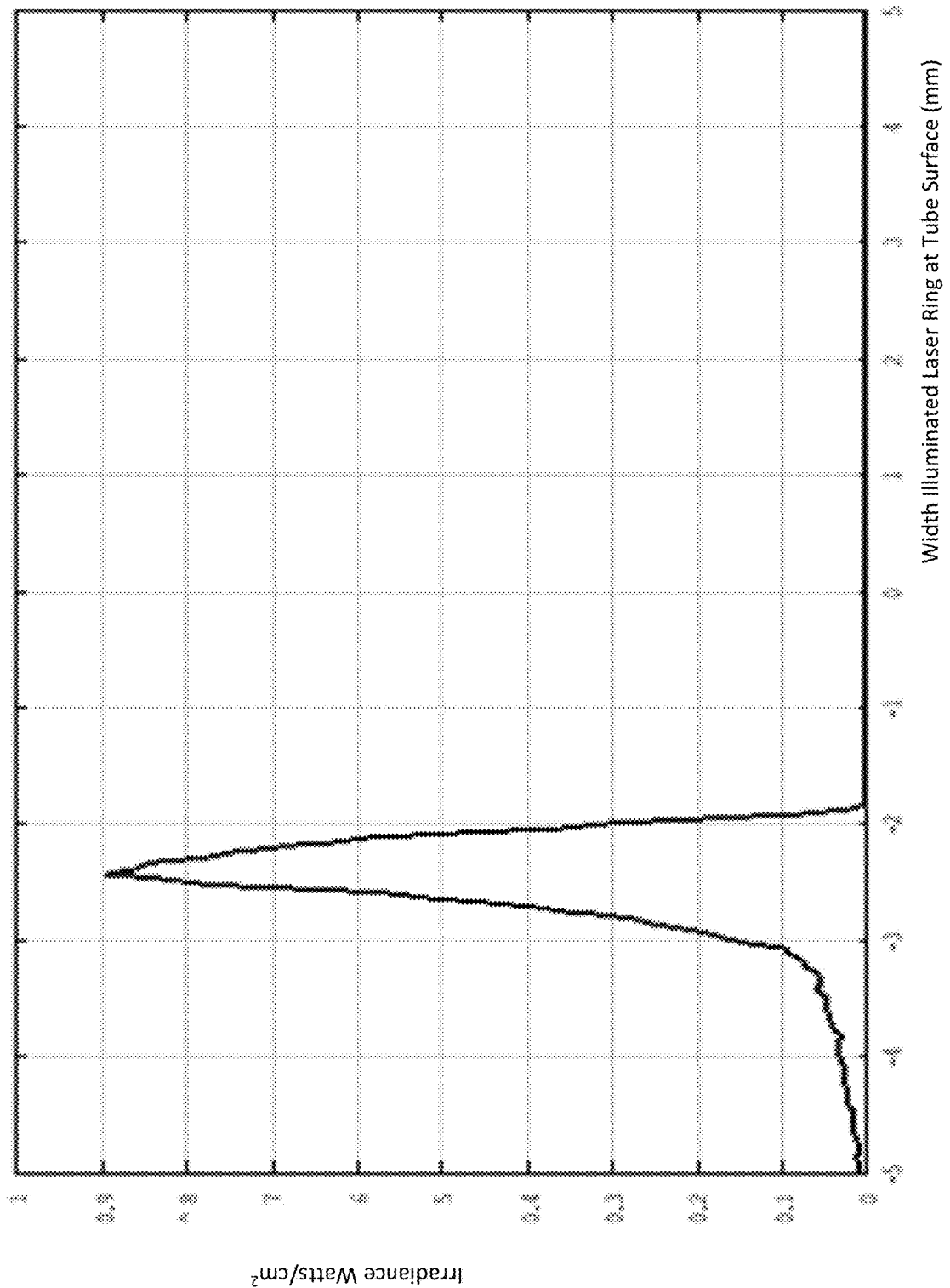
FIGS. 13A-13C are graphs for a Diffraction Axicon Prism of FIG. 8, of the Incoherent Irradiance watts/$cm^2$ (y-axis) versus the width of the illuminated laser ring at the tube surface in millimeters (mm) and for three different tube diameters: tube diameter 39 mm (FIG. 13A), 42 mm (FIG. 13B), and 45 mm (FIG. 13C), respectively.
Figure 13B:
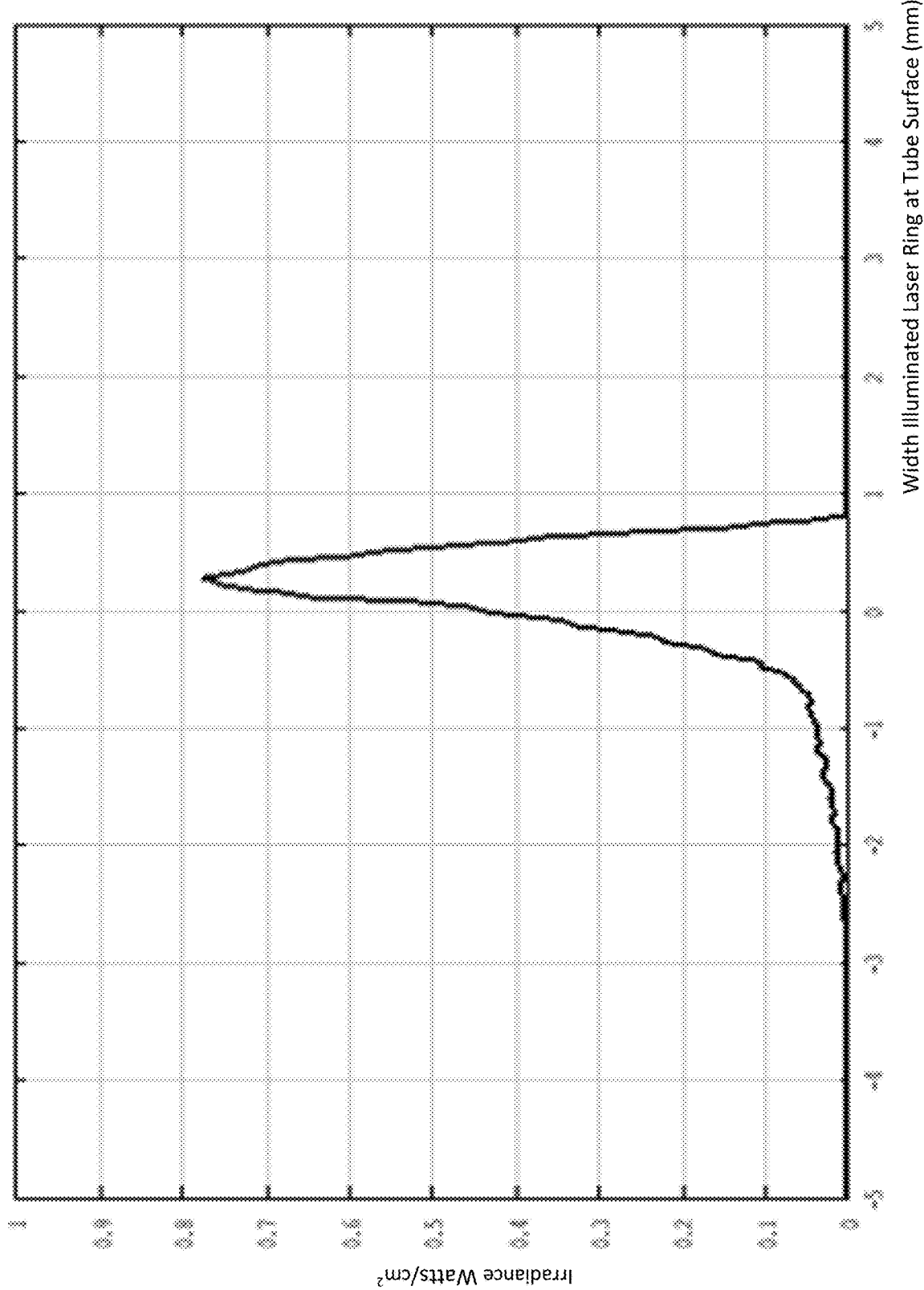
Figure 13C:
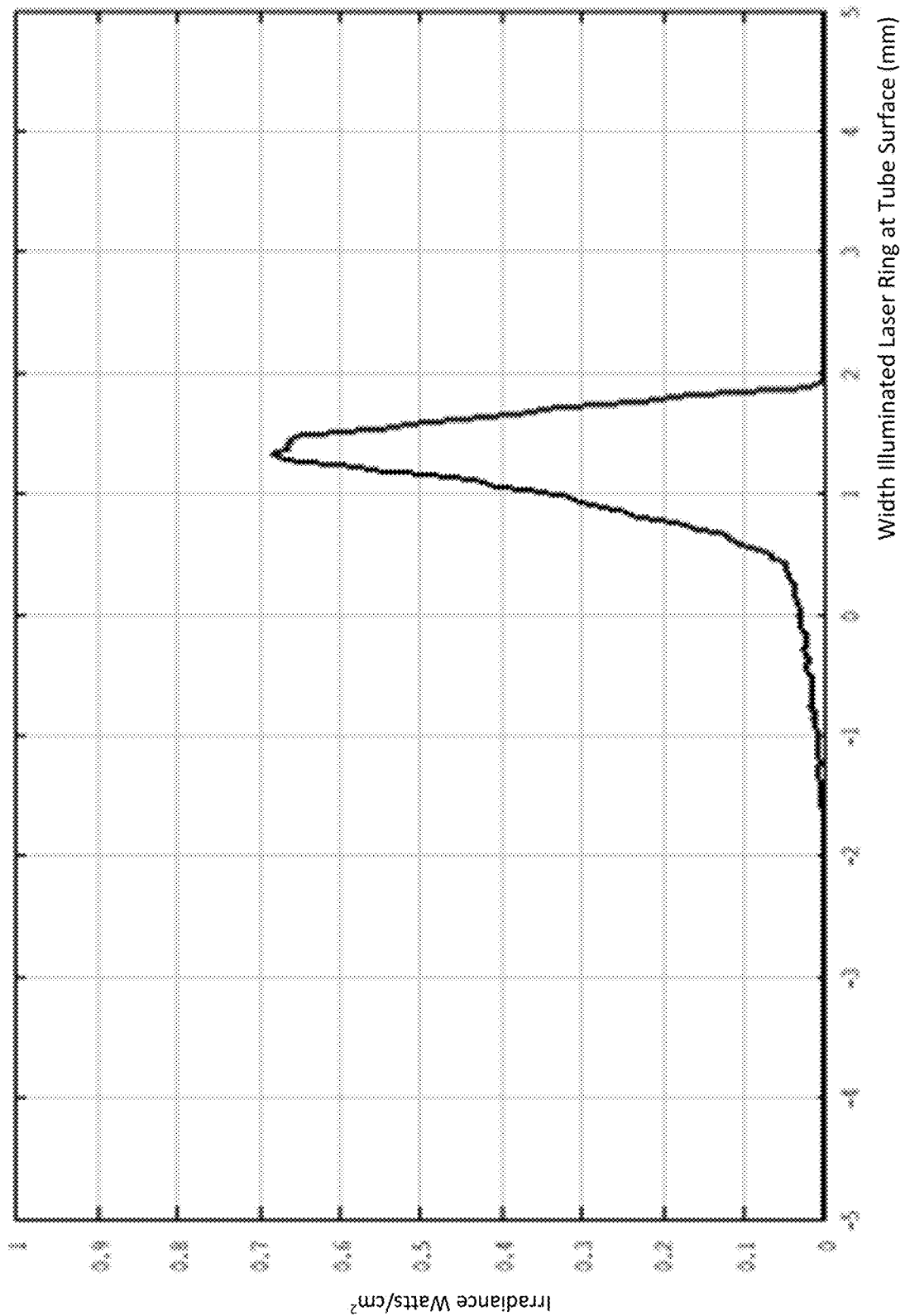

Referring FIGS. 13A-13C: are graphs of the Incoherent Irradiance in watts/cm$^2$ (y-axis) versus the width of the illuminated laser ring at the tube surface in millimeters (mm) at three different tube diameters: tube diameter 39 mm (FIG. 13A), 42 mm (FIG. 13B), and 45 mm (FIG. 13C), respectively. Results demonstrate that the width of illuminated laser ring at the tubes 9 inner surface 24 ranges from 0.6 to 0.68 mm at half maximum. And it ranges between 1.25 to 1.36 mm at 10% of maximum. However ablating irradiance ranges from 0.7 up to 0.9 W/cm$^2$.

Example 2

Another experiment was performed using the laser cleaning system of FIG. 12 comprising optics unit 6: a double convex lens 32, a plano-convex lens 34 with curves facing, and an TIR Axicon lens 98. The beam parameter (min) is 16.8 mm (lens 32), 16.4 mm (lens 34), and 9.3 mm (lens 98). Table 5 is shows irradiance parameters with respect to sampled tube 9 inner diameters; '39, 42, and 45 mm'.

TABLE 5

| LEVEL | Tube Diameter 39 mm | Tube Diameter 42 mm | Tube Diameter 45 mm |
|---|---|---|---|
| 0.5 max | 0.19 mm | 0.19 mm | 0.27 mm |
| 0.1 max | 0.45 mm | 0.27 mm | 0.50 mm |

Figure 14A:
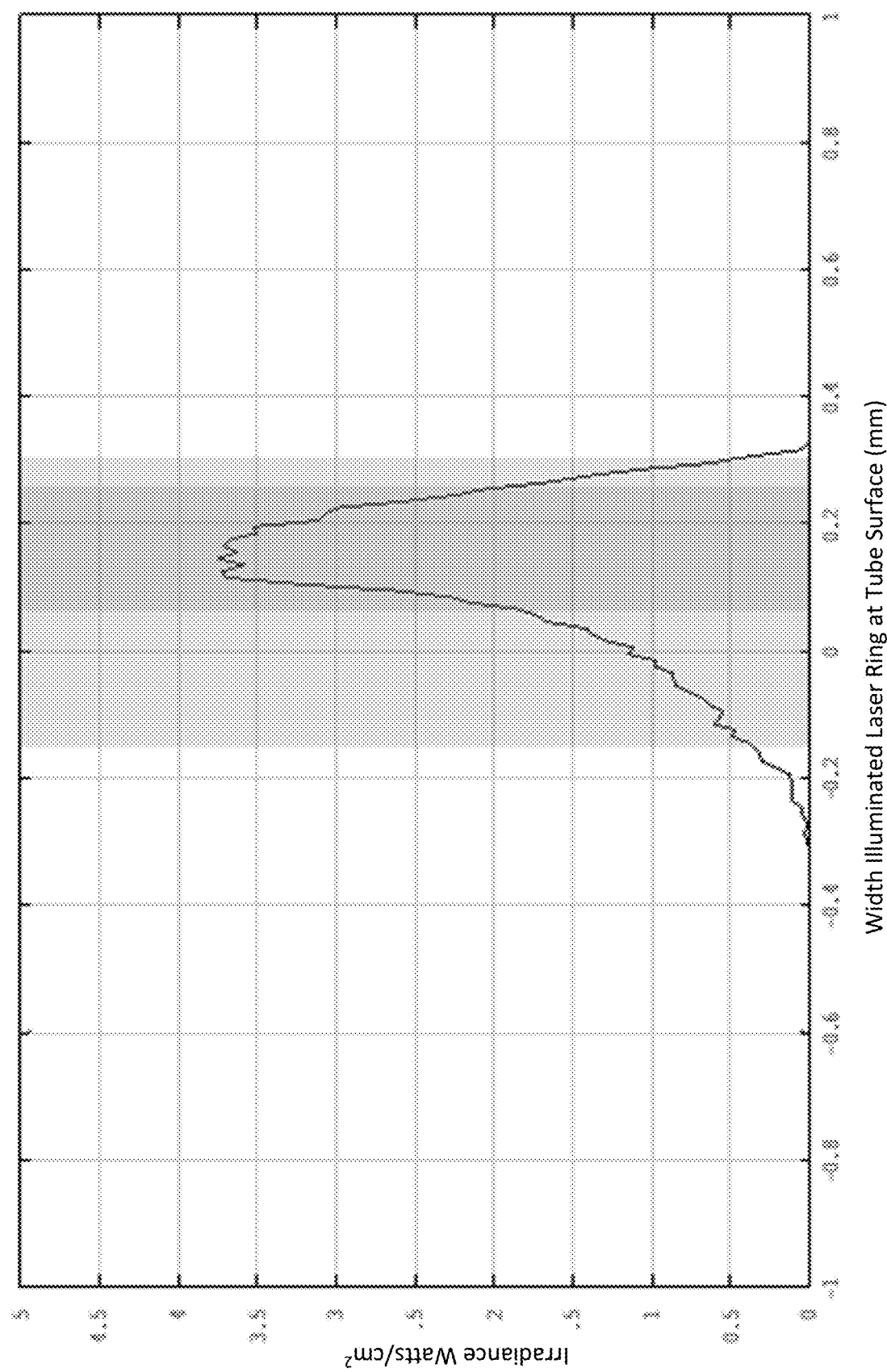
FIGS. 14A-14C are graphs for a TIR Axicon prism of FIG. 12, of the Incoherent Irradiance watts/$cm^2$ (y-axis) versus the width of the illuminated laser ring at the tube surface in millimeters (mm) and for three different tube diameters: tube diameter 39 mm (FIG. 14A), 42 mm (FIG. 14B), and 45 mm (FIG. 14C), respectively.
Figure 14B:
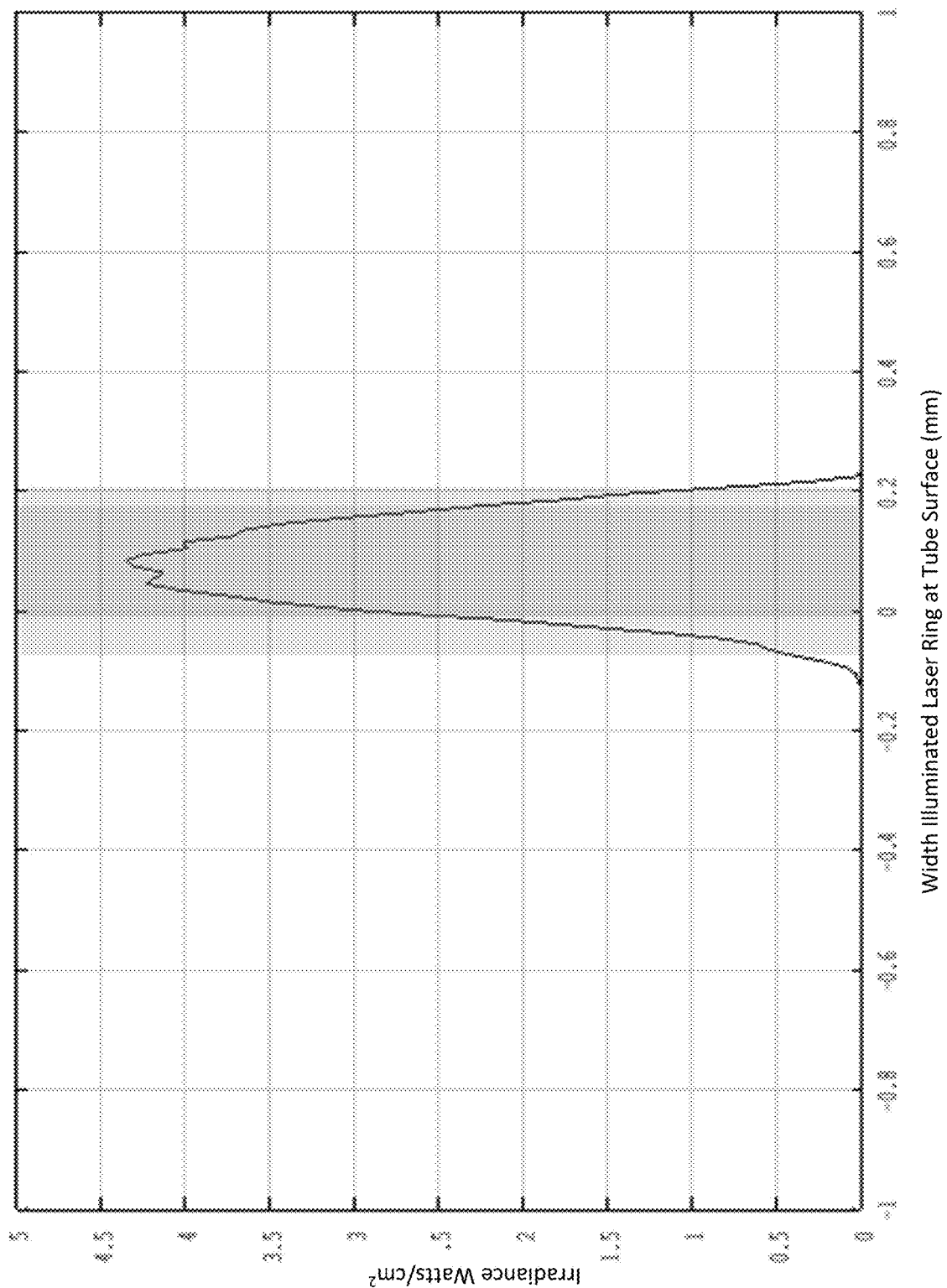
Figure 14C:
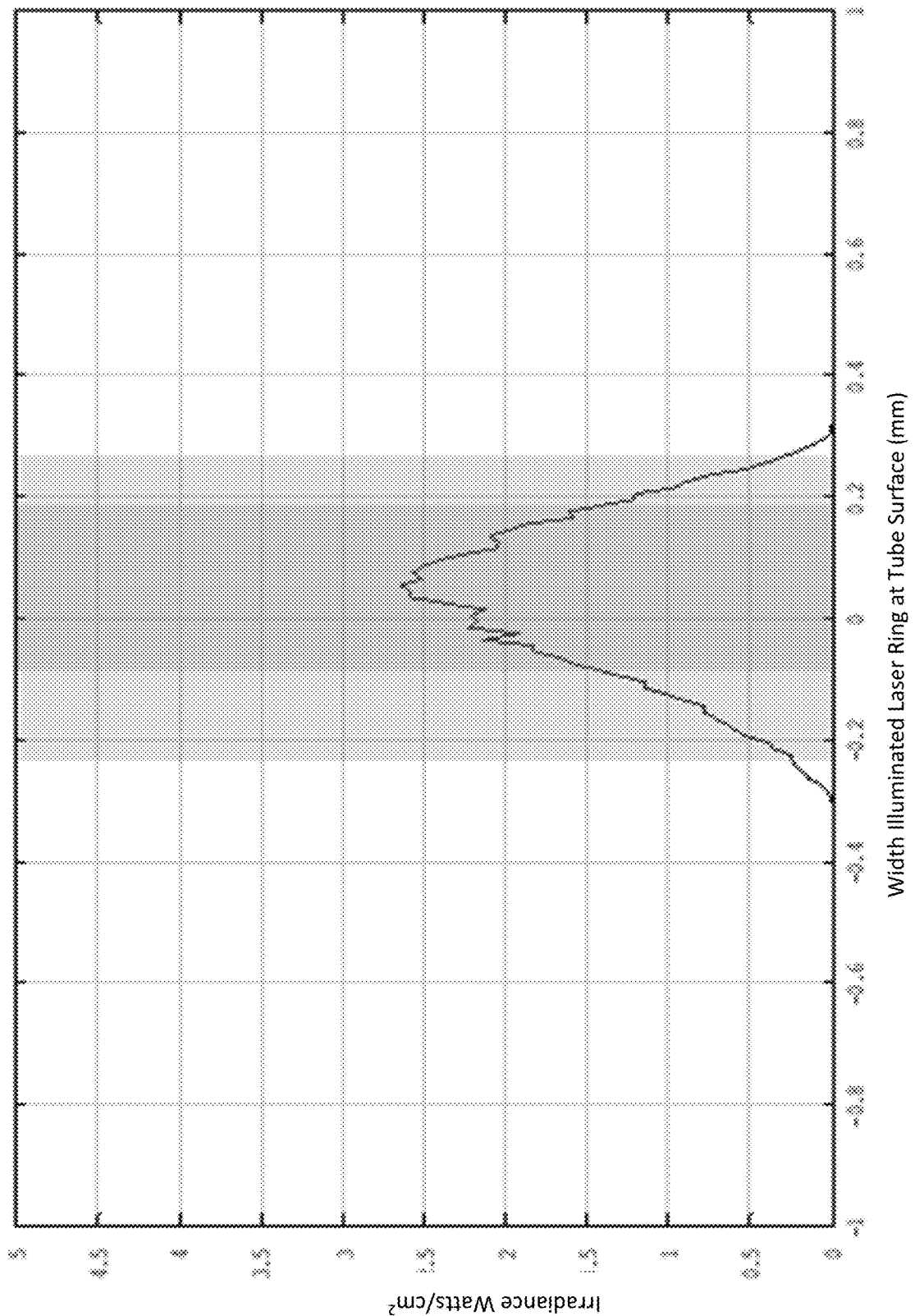

Referring FIGS. 14A-14C: are graphs of Incoherent Irradiance in watts/cm$^2$ (y-axis) versus the width of the illuminated laser ring at the tube surface in millimeters (mm) at three different tube diameters: tube diameter 39 mm (FIG. 14A), 42 mm (FIG. 14B), and 45 mm (FIG. 14C), respectively. Results demonstrate that the width of illuminated laser ring at the tubes 9 inner surface 24 ranges from 0.19 to 0.27 mm at half maximum. And it ranges between 0.27 to 0.5 mm at 10% of maximum. However ablating irradiance ranges from 2.64 up to 4.3 W/cm$^2$, which is significantly higher when compared with the Diffraction Axicon lens 36 of Example 1.

As a comparison; Optics unit 5 (diffraction axicon of Example 1) offers: less amount of energy in the ring because of slanted incidence on the tube; cheaper off-the-shelf axicon element for creation of illuminated ring; longer length of device; and lenses and axicon are fixed in common barrel with retaining ring.

While optics unit 6, 'TIR based' offers: more amount of energy in the ring because of normal incidence on the tube; expensive custom TIR axicon element for creation of illuminated ring; shorter length of device; and TIR axicon should be fixed at the tip of the barrel using adhesive.

CONCLUSION

The present invention provides the advantage that is an alternative method to the labor intense, hazardous, and extremely high cost conventional works that require mechanical forms of prior art cleaning devices. Conventional methods such as hydro-lancing, hydro-blasting, abrasive blasting, and pyrolysis could be minimized or in some cases be eliminated. Conventional methods traditionally require high-pressure water systems, corkscrew pattern could be left behind from high-pressure cleaning, and usually generates large amounts of wastewater and associated with higher level of risks exposure and environmental hazards. All that excludes shipping and transportation of the conventional machinery equipment around facility, and other regular maintenance costs. Industrial facility around the equipment may remain in service uninterrupted during laser cleaning operations. In many applications this is expected to provide a significant cost savings.

It will be appreciated that the methods and compositions and compounds of the present disclosure can be incorporated in the form of a variety of embodiments, only a few of which are disclosed herein. It will also be apparent for the expert skilled in the field that other embodiments exist and do not depart from the spirit of the invention. Thus, the described embodiments are illustrative and should not be construed as restrictive.

Accordingly, the preceding exemplifications merely illustrate the principles of the various embodiments. It will be appreciated that those skilled in the art will be able to devise various arrangements which, although not explicitly described or shown herein, embody the principles of the embodiments and are included within its spirit and scope. Furthermore, all examples and conditional language recited herein are principally intended to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the various embodiments, therefore, is not intended to be limited to the exemplary embodiments shown and described herein.

The transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

Or, the technology illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the technology claimed. The term "a" or "an" can refer to one of or a plurality of the elements it modifies (e.g., "a reagent" can mean one or more reagents) unless it is contextually clear either one of the elements or more than one of the elements is described.

The term "about" as used herein refers to a value within plus or minus 5% of the stated value.

Thus, it should be understood that although the present technology has been specifically disclosed by representative embodiments and optional features, modification and variation of the concepts herein disclosed may be resorted to by those skilled in the art, and such modifications and variations are considered within the scope of this technology.

As used herein, the term "substantially" refers to approximately the same shape as stated as recognized by one of ordinary skill in the art.

While several embodiments of the disclosure have been described, it is not intended that the disclosure be limited thereto, as it is intended that the disclosure be as broad in scope as the art will allow and that the specification be read likewise. Therefore, the above description should not be construed as limiting, but merely as exemplifications of embodiments.

Trademarks: the product names used in this document are for identification purposes only; and are the property of their respective owners.

What is claimed is:

1. A laser cleaning system (2) for cleaning a plurality of tubes (9) within a reactor or a heat exchanger, comprising:
    a. a fiber optic cable (12) comprising a proximal probe output end (20) and a distal cable end (17) able to emit a laser beam;
    b. a laser probe unit comprising a substantially hollow tubular housing (14) enclosing the distal cable end (17) and a laser emitting optics unit (5 or 6) comprising one or more of: a double convex lens, and/or one or two plano-convex lens, able to produce a reflected or a diffracted, fixed ring laser beam or a rotating laser beam, wherein a laser beam diameter is about equal to a tube inner diameter;
    c. an air vacuum system (30) positioned over the laser probe unit (14), and able to cool the laser cleaning system while removing debris;
    d. wherein said laser cleaning system emits a laser beam able to ablate clean a tube inner wall from rust and other corrosive deposits while sliding said laser probe unit manually or automatically through at least one tube; and
    e. wherein said laser cleaning system is safe by providing no user-contact with said tubes, laser beam, or debris.

2. The laser cleaning system of claim 1, wherein the optics unit (5) comprises from a proximal to a distal end: two plano-convex lens (32, 34), curved sides facing, and not touching.

3. The laser cleaning system of claim 2, wherein the optics unit (5) further comprises a Diffraction Axicon prism (36) spaced distally from one of plano-convex lens, and said optics unit able to emit a diffracted fixed ring laser beam.

4. The laser cleaning system of claim 1, wherein the optics unit (6) comprises from a proximal to a distal end: the double convex lens (32), and a plano-convex lens (34), curved sides facing and not touching.

5. The laser cleaning system of claim 4, wherein the optics unit (6) further comprises a galvo-scanning mirror (22) spaced apart distally from said plano-convex lens (34), said galvo-scanning mirror able to rotate clockwise or counter-clockwise to emit a reflected rotating laser beam.

6. The laser cleaning system of claim 5, wherein the laser probe unit further comprises on a distal end of the laser probe unit a rotating process head (21) with a hole (31), and the laser beam is able to emit from the hole.

7. The laser cleaning system of claim 4, wherein the optics unit (6) further comprises a Total Internal Reflection (TIR) Axicon Prism (98) spaced apart distally from the plano-convex lens (34), and said optics unit is a able to emit a reflected fixed ring laser beam.

8. The laser cleaning system of claim 4, wherein the optics unit (6) further comprises a mirror cone (96) spaced about apart distally from the plano-convex lens (34), and said optics unit is a able to emit a reflected fixed ring laser beam.

9. The laser cleaning system of claim 1, wherein the laser beam covers a spot with an area of between about 0.3 to about 2 $cm^2$; and/or wherein the rotating laser probe pulses a laser beam with about 20% to about 30% overlap.

10. The laser cleaning system of claim 1, wherein said vacuum system (30) comprises: a plurality of nozzles (30a) able to suction in vaporized rust or other deposits into a plurality of connecting tubes (30b,c) for transmission to the a connected vacuum generator 35.

11. The laser cleaning system of claim 1, further comprising a push motor (60) positioned over the probe output end (20), said push motor able to manually or automatedly push and pull the laser cleaning probe in/out of the tube.

12. The laser cleaning system of claim 11, wherein the push motor further comprises a plurality of magnetic wheels (38), one wheel per a pivotable motor leg, wherein the magnetic wheels make contact with an inner tube wall (24) of each tube (9).

13. The laser cleaning system of claim 1, wherein the laser cleaning system further comprises one or more of: a printed circuit board (99) with a processor and a memory (101), a power source (100), and a wireless transmitter (102) within the laser probe unit.

14. The laser cleaning system of claim 1, wherein the laser cleaning system further a camera (103) or other image scanning device attached to the laser probe unit for real-time visual examination of the cleaning progress.

15. The laser cleaning system of claim 1, wherein the laser is a pulsing beam comprising one or more of: an energy between about 25 to about 100 ns pulse duration, and about 1 to about 150 mJ per pulse; an energy density (fluence) between about 5 to about 10 $J/cm^2$; and an average output power between about 200 W to about 2000 W.

16. The laser cleaning system of claim 1, wherein the distance between the double convex lens (32), and/or one or two plano-convex lens (34), is about 2.0 to about 3.0 millimeters.

17. The laser cleaning system of claim 1, wherein the distance between the plano-convex lens (32) and a distal lens is about 19.0 millimeters to about 25.0 millimeters.

18. The laser cleaning system of claim 1, wherein the diameter of the lens within the optics unit is about 20 millimeters to about 25 millimeters.

* * * * *